United States Patent
Brinkman et al.

(10) Patent No.: US 7,668,044 B2
(45) Date of Patent: Feb. 23, 2010

(54) DATA OFFLOAD AND CHARGING SYSTEMS AND METHODS

(75) Inventors: Russell B. Brinkman, Louisville, CO (US); Scott K. Burkholder, Littleton, CO (US); Christopher Bruce Crosby, Firestone, CO (US); Paul D. Favret, Littleton, CO (US); Todd J. Fockler, Golden, CO (US); Joseph L. Kapushion, Erie, CO (US); Aaron Stafford Oakley, Boulder, CO (US); Robert Stewart, Boulder, CO (US); James Muir Drummond, Houston, TX (US)

(73) Assignee: Ascend Geo, LLC, Golden, CO (US)

( * ) Notice: Subject to any disclaimer, the term of this patent is extended or adjusted under 35 U.S.C. 154(b) by 794 days.

(21) Appl. No.: 11/118,103

(22) Filed: Apr. 28, 2005

(65) Prior Publication Data

US 2005/0246137 A1    Nov. 3, 2005

Related U.S. Application Data

(63) Continuation-in-part of application No. 10/418,940, filed on Apr. 18, 2003, now Pat. No. 6,934,219.

(60) Provisional application No. 60/567,382, filed on Apr. 30, 2004, provisional application No. 60/375,545, filed on Apr. 24, 2002.

(51) Int. Cl.
    *G01V 1/00* (2006.01)
(52) U.S. Cl. .................. 367/76; 367/80; 320/115
(58) Field of Classification Search ............ 379/39; 367/76–79, 80; 320/107, 110, 114, 115
See application file for complete search history.

(56) References Cited

U.S. PATENT DOCUMENTS

| | | | |
|---|---|---|---|
| 3,812,457 A | 5/1974 | Weller | |
| 4,070,643 A | 1/1978 | Green | |
| 4,257,098 A * | 3/1981 | Lacy | 714/49 |
| 4,319,347 A * | 3/1982 | Savit | 367/52 |
| 4,493,063 A | 1/1985 | Tims et al. | |
| 4,583,206 A * | 4/1986 | Rialan et al. | 367/78 |
| 4,631,708 A * | 12/1986 | Wood et al. | 367/2 |
| 4,750,156 A | 6/1988 | Abrams et al. | |
| 4,782,446 A * | 11/1988 | Ehler et al. | 702/14 |

(Continued)

OTHER PUBLICATIONS

Vectorseis System Four VR brochure 2002 Input/Output, Inc.

*Primary Examiner*—Edward Tso
*Assistant Examiner*—Arun Williams
(74) *Attorney, Agent, or Firm*—Townsend and Townsend and Crew LLP

(57) ABSTRACT

Apparatus and methods are provided for simultaneously retrieving data from multiple data acquisition units and for recharging such data acquisition units. The data offload and charging unit comprises a frame that defines stations for holding the data acquisition units and a host computer. A combined power and communications port at each such station is adapted to interface with one of the data acquisition units such that power may flow from the data offload and charger unit to that data acquisition unit and data may flow from that data acquisition unit to the host computer substantially simultaneously. Communications links are provided between the host computer and each combined power and communications port.

17 Claims, 16 Drawing Sheets

U.S. PATENT DOCUMENTS

| | | | | |
|---|---|---|---|---|
| 4,906,928 A | * | 3/1990 | Gard | 324/240 |
| 5,111,399 A | * | 5/1992 | Armitage | 702/17 |
| 5,162,935 A | * | 11/1992 | Nelson | 398/107 |
| 5,253,219 A | * | 10/1993 | Houston et al. | 367/79 |
| 5,276,655 A | | 1/1994 | Rialan et al. | |
| 5,301,346 A | * | 4/1994 | Notarianni et al. | 700/267 |
| 5,548,562 A | | 8/1996 | Helgerud et al. | |
| 5,684,671 A | * | 11/1997 | Hobbs et al. | 361/683 |
| 5,925,119 A | * | 7/1999 | Maroney | 710/315 |
| 5,978,313 A | | 11/1999 | Longaker | |
| 6,002,339 A | | 12/1999 | Norris | |
| 6,070,129 A | | 5/2000 | Grouffal et al. | |
| 6,078,283 A | | 6/2000 | Bednar | |
| 6,219,620 B1 | | 4/2001 | Park et al. | |
| 6,711,365 B2 | * | 3/2004 | Ohtani | 399/82 |
| 6,771,044 B1 | * | 8/2004 | Vinciguerra et al. | 320/116 |
| 6,775,202 B2 | * | 8/2004 | Mueller-Dombois | 367/13 |
| 6,804,016 B2 | * | 10/2004 | Hashimoto et al. | 358/1.13 |
| 7,013,336 B1 | * | 3/2006 | King | 709/224 |
| 7,218,890 B1 | * | 5/2007 | Iseli et al. | 455/9 |
| 2002/0004912 A1 | * | 1/2002 | Fung | 713/300 |
| 2002/0012453 A1 | * | 1/2002 | Hashimoto et al. | 382/112 |
| 2002/0018231 A1 | * | 2/2002 | Ebina et al. | 358/1.15 |
| 2002/0161866 A1 | * | 10/2002 | Tozer et al. | 709/220 |
| 2003/0163748 A1 | * | 8/2003 | Calkins et al. | 713/500 |
| 2004/0105533 A1 | | 6/2004 | Iseli | |
| 2004/0252585 A1 | * | 12/2004 | Smith et al. | 367/66 |
| 2004/0254730 A1 | * | 12/2004 | Najmuddin | 702/2 |

\* cited by examiner

DATA OFFLOAD AND CHARGING SYSTEMS AND METHODS

CROSS-REFERENCES TO RELATED APPLICATIONS

This application is a nonprovisional of U.S. Prov. Pat. Appl. No. 60/567,382, entitled "METHODS AND SYSTEMS FOR ACQUIRING SEISMIC DATA," filed Apr. 30, 2004 by Scott K. Burkholder et al., the entire disclosure of which is incorporated herein by reference for all purposes. This application is also a continuation-in-part application of U.S. patent application Ser. No. 10/418,940, entitled "METHODS AND SYSTEMS FOR ACQUIRING SEISMIC DATA," filed Apr. 18, 2003 by Scott K. Burkholder et al., which is a nonprovisional of U.S. Prov. Appl. No. 60/375,545, entitled "A CABLE-LESS SEISMIC DATA RECORDER AND A METHOD FOR SYNCHRONIZING MULTIPLE SEISMIC DATA SETS," filed Apr. 24, 2002, the entire disclosures of both of which are incorporated herein by reference for all purposes.

This application is also related to the following concurrently filed, commonly assigned applications: "METHODS AND SYSTEMS FOR ACQUIRING AND PROCESSING SEISMIC DATA," by Scott K. Burkholder et al. and "SEISMIC-DATA ACQUISITION METHODS AND APPARATUS," by Russell Brinkman et al., each of which is incorporated herein by reference in its entirety for all purposes.

BACKGROUND OF THE INVENTION

This application relates generally to methods and systems for acquiring seismic data. More specifically, this application relates to methods and systems for acquiring seismic data without the need for wireline telemetry or radio-telemetry components or radio initiation.

Present-day land-based oil and gas drilling sites are selected from three-dimensional images produced through the use of reflection seismic data. The images are developed from data acquisition through active seismic tomography. Synthesized physical shock waves are applied to a survey site. These waves reflect off rock strata at variable velocities and return to the surface. Geophones at the surface measure and record the ground motion at the survey site. The seismic response from each receiver point (a geophone unit or the summed response of several geophone units) is collected centrally by a data collection center. The collected data are reduced through sophisticated computer analysis for producing three-dimensional maps of the geologic structure.

A typical seismic survey site can comprise an active receiver spread measuring tens of square kilometers, with a plurality of receiver points located on a grid every 15-100 m. The seismic receivers are intended to respond to seismic events induced by human-generated explosives or mechanical sources. Accordingly, the receivers are typically configured to record data for time periods of about several seconds. In addition, the use of human-generated explosives limits the geographic distribution of the receivers since explosives often cannot be used within towns or cites, among other examples.

Examples of currently used modes for seismic recording include the following: (1) seismic data from each receiver channel are transmitted to a central collection unit via wires; (2) seismic data from each receiver are transmitted to the central collection unit via radio telemetry; and (3) data from each receiver channel are recorded in flash memory and downloaded later when each unit is connected to and processed by a mass storage device, such as a hard drive. Each of these modes has at least some disadvantages, a common one of which is the need for transmission of specific timing signals to the collection units to synchronize recording with the time of the human-generated seismic-vibration-inducing explosion. For example, while wire telemetry is reliable, quick, and allows examination of the collected data within seconds of recording, it requires the layout and maintenance of wires, which may frequently be disturbed, such as by animals or other sources of disturbance. Radio telemetry removes the need to maintain the wireline correction, but requires maintaining radio contact with all receiver units and the transmission of large amounts of data through shrinking commercial radio bands. Wireless telemetry is also slow and unreliable. The third mode removes some of the wireline connections, but still requires radio transmission of status and specific radio start-time synchronization information.

There is, accordingly, a general need in the art for improved methods and systems of acquiring seismic data.

BRIEF SUMMARY OF THE INVENTION

Embodiments of the invention provide apparatus and methods for simultaneously retrieving data from a plurality of data acquisition units and recharging such data acquisition units. The data offload and charging unit comprises a frame that defines a plurality of stations for holding the data acquisition units and a host computer. A combined power and communications port at each such station is adapted to interface with a respective one of the data acquisition units such that power may flow from the data offload and charger unit to the respective one of the data acquisition units and data may flow from the respective one of the data acquisition units to the host computer substantially simultaneously. Communications links are provided between the host computer and each combined power and communications port.

Orientation structure may also be provided at each station to maintain the respective one of the data acquisition units in a predetermined orientation relative to the combined power and communications port. In addition, the unit may comprise a communications link from the host computer to a data-reduction computer having programming to receive and analyze data received from the host computer.

The data offload and charging unit may be organized with a plurality of offload/charging modules. Each such offload/charging module is interfaced with a distinct plurality of the stations. In one embodiment, each offload/charging module comprises a data multiplexer to combine data received from each of the stations interfaced with the offload/charging module.

The host computer may include microprocessor code for implementing data flow from the data acquisition units to the host computer. Instructions may cause code to be loaded from the host computer into a connected data acquisition unit upon detection that the connected data acquisition unit has been connected with a respective one of the stations as part of a data-offload process. The instructions may include instructions to disconnect a boot field code to allow code specific to the data-offload process to be loaded into the connected data acquisition unit. In one embodiment, the host computer comprises a plurality of host computers interconnected with a computer network, each such host computer having an interface to a subset of the plurality of the stations.

Another set of embodiments provides a method for retrieving data stored on a plurality of data acquisition units. The plurality of data acquisition units are received at stations of a data offload and charger unit. Each such data acquisition unit is interfaced at a respective interface. Data are downloaded from each such data acquisition unit through the respective interface to a host computer. A battery comprised by each data acquisition unit is recharged through the respective interface substantially simultaneously with downloading data from the data acquisition unit.

In some embodiments, the downloaded data are transmitted from the host computer to a data-reduction computer for processing. Downloading the data may comprise multiplexing data from each data acquisition unit of a plurality of distinct subsets of the data acquisition units. Code from the host computer may be loaded into a connected data acquisition unit that has been connected with a respective one of the stations as part of a data-offload process. Loading the code may comprise disconnecting a boot field code to allow code specific to the data-offload process to be loaded into the connected data acquisition unit.

A third set of embodiments provides a system for processing seismic data. A plurality of data acquisition units hold seismic data collected over a survey area. The system also includes a host computer. A data offload and charger unit has a plurality of stations for holding the data acquisition units and is adapted to interface with each of the data acquisition units to simultaneously retrieve data from the data acquisition units and recharge the data acquisition units. Communications links are provided from the host computer to each of the plurality of stations of the data offload and charger unit. A data-reduction computer has programming instructions to receive and analyze data received from the host computer. A communication link is provided from the host computer to the data-reduction computer.

In some embodiments, the data offload and charger unit comprises a plurality of offload/charging modules. Each such offload/charging module is interfaced with a distinct plurality of the stations. Each such offload/charging module may comprise a data multiplexer to combine data received from each of the stations interfaced with the offload/charging module.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1A:
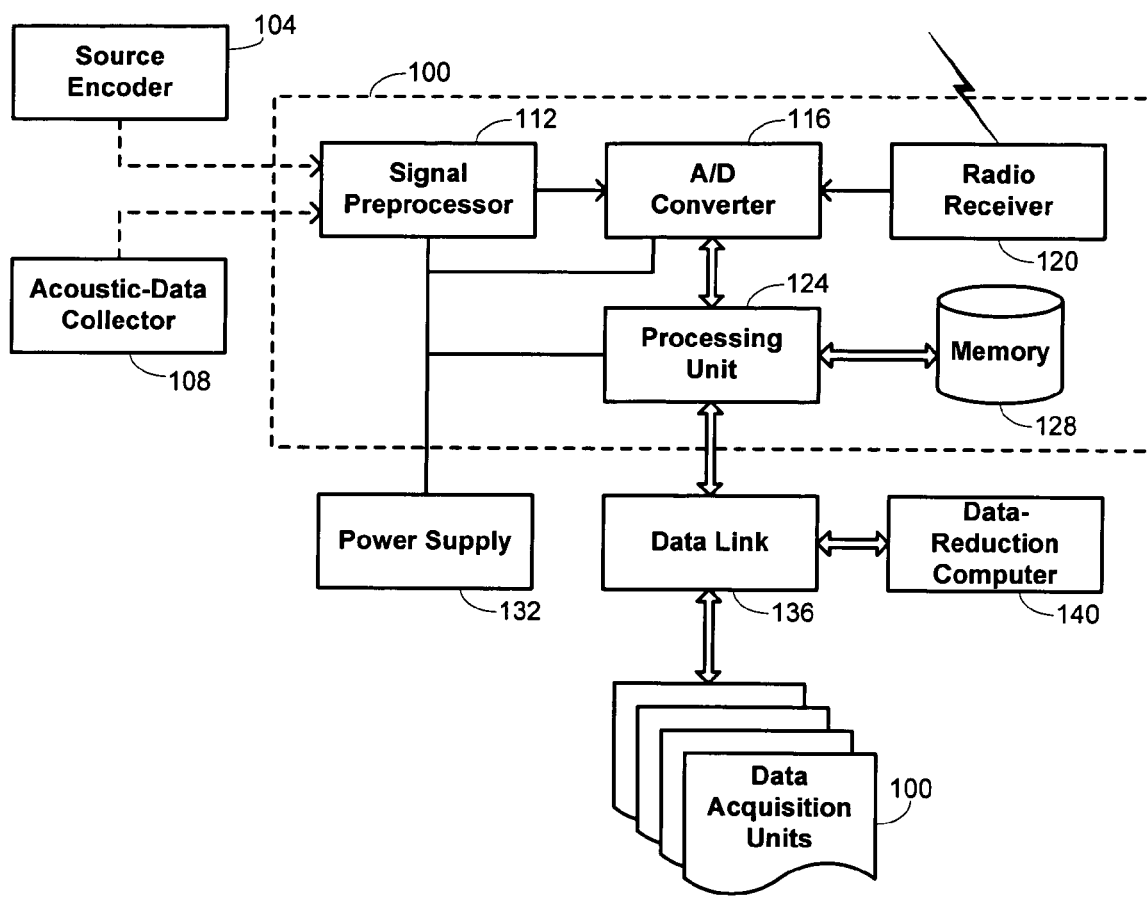
FIG. 1A provides a block-diagram representation of a system for acquiring seismic data in accordance with an embodiment of the invention.

Embodiments of the invention are directed to methods and systems for acquiring seismic data. As used herein, references to "acquiring" seismic data are intended to be construed broadly as referring to various stages in a seismic-data acquisition process, including collection, storage, and processing of seismic data.

Embodiments of the invention make use of a plurality of individual wireless seismic data acquisition units. The individual data acquisition units may function as data sensor recorders and/or as source-event recorders. Each data acquisition unit records an independent stream of seismic data over time, such as in the form of displacement versus time. The data acquisition units do not require radio contact with other data acquisition units, nor do they require direct synchronization with other receiver units or with a source start time. In addition, the data acquisition units do not require that a master unit initiate a recording sequence. In these embodiments, it is possible to eliminate the use of telemetry cables tied to a receiver station. Instead, information distributed to the units may be downloaded using a wireless network protocol, such as a wireless local-area-network protocol, by using a physical connection, or by using an infrared connection.

In some embodiments, each data acquisition unit may comprise a lightweight, battery-powered device that may be attached to the structure of an existing geophone. In addition, any number of units may be used in conjunction with an existing recording system to fill areas of lost coverage. Furthermore, the data acquisition units may be placed in locations difficult for cable-connected geophones to reach or where radio contact is difficult. In certain embodiments, the data acquisition units may be configured for continuous recording over different periods of time, such as periods of time that exceed one minute, periods of time that exceed one hour, and even periods of time that exceed one day. In a particular embodiment, the data acquisition units may record continuously for periods of time that exceed one week. In other embodiments, the data acquisition units may be configured to toggle between on and off positions at predetermined times or in response to seismic vibrations within predetermined amplitude ranges. In either case, data representing the received seismic acoustic signals may be stored on internal memory for later retrieval and processing.

The structure of the data acquisition units permits their random placement within a survey area, permitting a reduction in the spurious phenomenon known as "acquisition footprint" that is present in most three-dimensional seismic data sets. Also, the ability to move a single station collector to random locations permits an increase of receiver-point density and subsurface coverage, commonly referred to as a "fold," in areas of high ambient noise or low source-point density. The actual location of the data acquisition unit after it is placed may be determined with a global-positioning-system ("GPS") unit within the data acquisition unit. Such a feature eliminates the need for a surveyor to measure the location of each individual receiver unit.

The ability of the data acquisition units to record continuously over significant periods of time permits increased flexibility in the data that may be collected and in the types of analyses that may be performed. For example, continuous recording allows stacking many weak source points, such as provided by mini-sosie and elastic-wave generators, thereby increasing the effective depth of reflective signals and reducing unwanted random seismic noise. This ability thus increases the utility of such weaker sources, which otherwise might provide effective data only from near and shallow reflective events. Also, as explained further below, continuous recording permits stacking of passive and/or random sources of noise, which may be used to collect data in urban or suburban environments where the use of explosives is difficult.

Figure 1B:
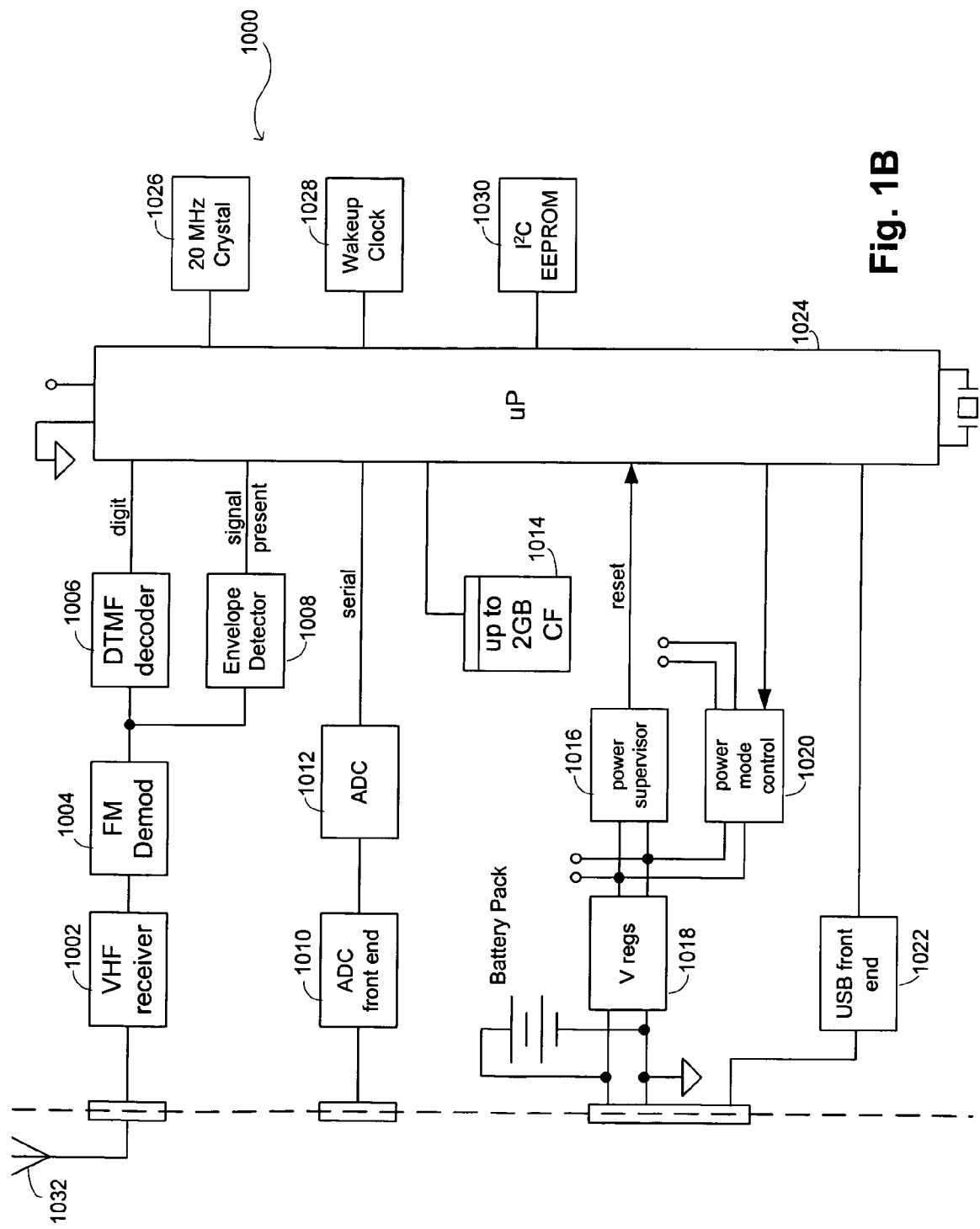
FIG. 1B provides a block-diagram representation of a structure for a data-acquisition unit used with the system of FIG. 1A in an embodiment.

An example of a data acquisition unit 100 in an embodiment of the invention is shown in FIG. 1A. As shown in FIG. 1A, the data acquisition unit 100 may interface with a source encoder 104, which may be part of vibroseis electronics or of electronics used in conjunction with a dynamite blaster, or an acoustic-data collector 108 such as a geophone, an accelerometer, or the like. There are a variety of different types of geophones that may be used. For example, in one embodiment, P-wave ("primary" or "pressure") collectors are used, which have strings having only vertical elements to detect upward-heading compressional waves; in another embodiment, S-wave ("secondary" or "shear") collectors are used, which have strings having only horizontal elements to detect transverse waves; in a further embodiment, three-component collectors are used, having strings with vertical, in-line, and cross-line sensor elements. Collectors may comprise accelerometers or hydrophones in different embodiments. The source encoder 104 and/or acoustic-data collector 108 may be provided external to the data acquisition unit 100 as shown in FIG. 1A, in which case a housing of the data acquisition unit 100 may comprise external interfacing connections. Alternatively, the source encoder 104 and/or acoustic-data collector 108 may be integrated internally with the data acquisition unit, an example of which is shown in FIG. 1B discussed below. Within the housing are a number of modules, some of which may be included on a printed circuit-board assembly. For example, the printed circuit-board assembly could include a signal preprocessor 112 and an analog-to-digital converter 116 connected with the input sensor for receiving the active seismic data. The signal preprocessor 112 could include amplifiers, filters, and the like to amplify and/or select specific data components of interest from the active seismic data.

In addition, the data acquisition unit 100 may comprise a radio receiver 120 and antenna. The radio receiver 120 may be used as described below to capture an ambient signal for use as an independent synchronization measure. The ambient signal may be an electromagnetic signal that is broadcast for purposes unrelated to seismic investigation. For example, the ambient signal could comprise a radio signal from a nearby AM, FM, short-wave, or other wavelength radio transmission in the form of a local commercial broadcast, GPS timing signal, Universal Synchronized Time broadcast signal, or other ambient signal. Characteristics of the ambient signal may be used to synchronize the data acquisition units 100 by accounting for variations in internal time of the data acquisition units 100. In some instances, the radio receiver 120 is capable only of detecting certain wavelengths so that the data acquisition unit 100 is limited to providing synchronization information with specific types of signals. In other embodiments, the radio receiver 120 is tunable so that it may be configured to identify and collect different types of ambient-signal data in accordance with a defined state of the radio receiver 120. In cases where the radio receiver 120 is configured to receive GPS signals, it may also be configured to function as a GPS unit to derive location information for the data acquisition unit 100.

Thus, when the data acquisition unit 100 is operating and interfaced with an acoustic-data collector 108, the acoustic-data collector 108 provides seismic data such as in the form of collector amplitude versus time on one or more channels. The signal from the collector 108 is passed through the signal preprocessor 112 for amplification and filtering, and then passed to the analog-to-digital converter 116 for digitization. Signals from the radio receiver 120 may also be digitized by the analog-to-digital converter 116 and, in one embodiment, are embedded with the seismic data.

Operation of the signal preprocessor 112, analog-to-digital converter 116, and/or radio receiver 120 may be controlled by a processing unit 124, which may comprise, for example, a commercially available digital signal processor ("DSP"). The digitized seismic data and digitized radio-signal data may be processed by the processing unit 124 and described below, perhaps including embedding them with each other, and stored in a memory device 128, such as flash memory, random-access memory, a hard drive, or the like. In an alternative embodiment, parallel data streams may be used to embed the data representing the ambient signal into the seismic data and to write the ambient-signal data directly to memory. The various components of the data acquisition unit 100 may be powered with a power supply 132, which is shown external to the unit 100 but which may alternatively be integrated internally to the unit 100. The power supply 132 may comprise, for example, a solar cell, a chemical battery, or the like.

FIG. 1B provides a schematic illustration of a structure for a data acquisition unit in one embodiment. The data acquisition unit is denoted generally by reference number 1000, with actions executed by the unit coordinated by a microprocessor 1024. In this embodiment, the microprocessor 1024 is interfaced with a 20 MHz crystal 1026, a wakeup clock 1028, an I$^2$C EEPROM 1030, and memory 1014, such as a compact flash memory. The wakeup clock provides a periodic pulse that dictates the microprocessor sleep/listen duty cycle. In one embodiment, the circuit makes the microprocessor stay awake for at least one second and allows the microprocessor to sleep for about 1.5 minutes. This pulse is normally not generated when the data acquisition unit is connected with the data offload and charging unit. The EEPROM 1030 is connected to the I$^2$C bus of the microprocessor and contains the microprocessor's program code. The memory 1014 may be connected to a GPIF port of the microprocessor and in the illustrated embodiment accommodates up to 2 GB of compact flash memory for data acquisition.

One interface with the microprocessor is provided through an antenna 1032 that may receive electromagnetic signals routed through a VHF receiver 1002 and FM demodulator 1004. The VHF receiver 1002 receives an FM signal in the VHF band, with the modulated output being in the audio band and sent to a DTMF decoder 1006 and envelope detection circuit 1008. The antenna may be an RF antenna in one embodiment. The DTMF decoder 1006 converts the audio output of the VHF receiver into DTMF digits and the envelope detector 1008 permits the data acquisition unit to identify whether a signal is present. An analog-to-digital converter 1012 is connected to an interface through an analog-to-digital converter front end 1010. A USB interface may be provided with a USB front end 1022. The USB interface is used in connecting to a data offload and charging unit as described in greater detail below. Power is regulated by a battery pack in connection with a voltage regulator 1018, a power supervisor, and a power mode control component 1020. The use of these elements is described more fully below in connection with a description of structural configurations for the data acquisition units in some embodiments.

Figure 1C:
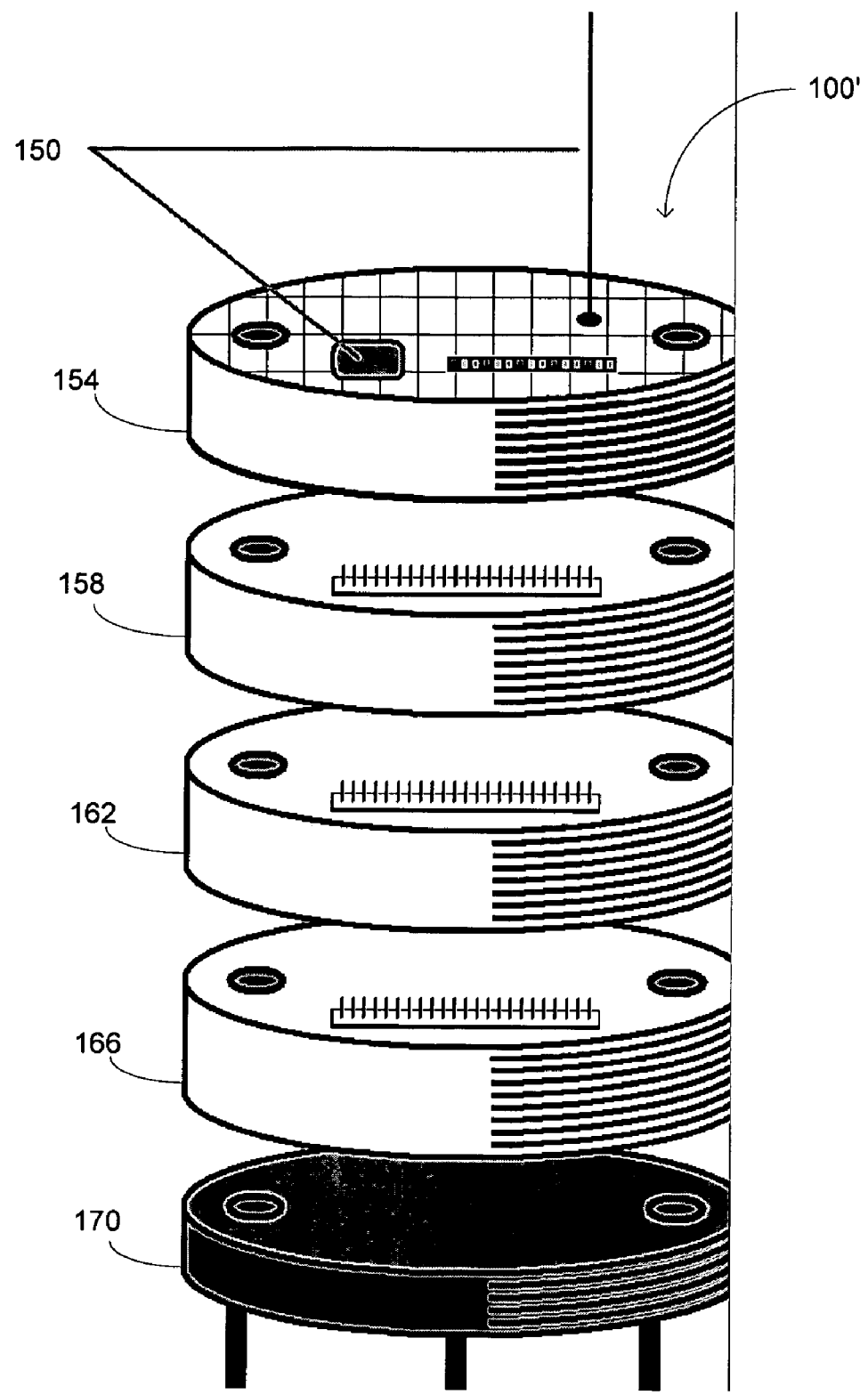
FIG. 1C provides a representation of another arrangement for a data acquisition unit in an embodiment of the invention.

FIG. 1C provides an example of such a structural configuration for a data acquisition unit in an embodiment of the invention. In this instance, the data acquisition unit 100' is configured as a layered and integrated acquisition system. The various components are supported by a base plate 170, with the different functionality of the device corresponding to different layers in its structure. For example, the geophone elements 166 may be provided in one layer, the acquisition elements 162 may be provided in another layer, the communications and GPS elements 158 may be provided in a further layer, and the power components 154 are provided in still another layer. In the illustrated embodiment, the power components 154 are provided as a top layer to take advantage of the use of solar cells. It is preferable that the communications and GPS elements 158 be provided in a position where they may communicate easily with antennae 150 that receive the ambient signals. In one embodiment, each data acquisition unit 100' may be provided with at least two antennae receivers 150, one to receive GPS location and system timing signals and the other to conduct inter-unit communications.

Figure 1D:
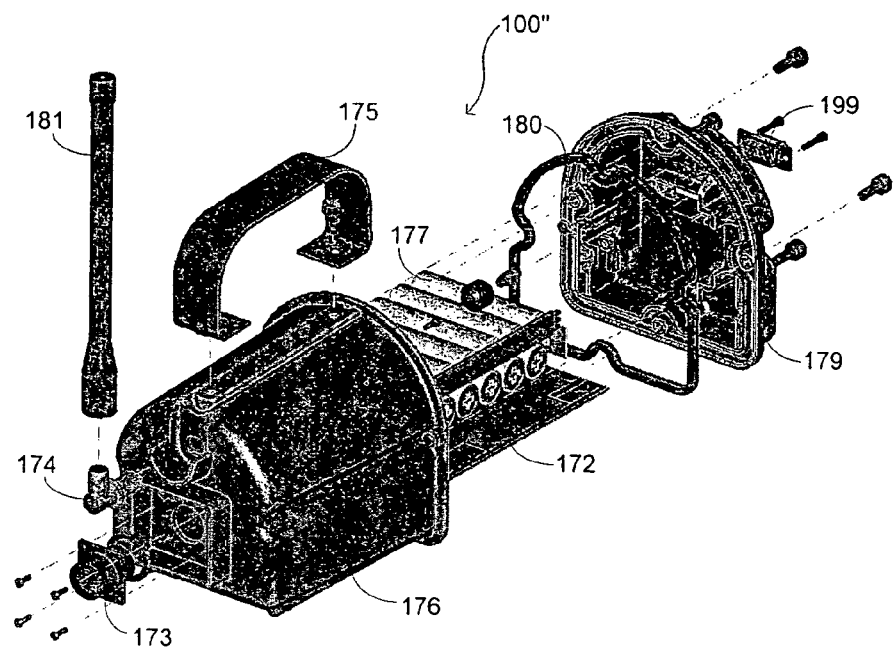
FIG. 1D provides an exploded view of a data acquisition unit in another embodiment of the invention.
Figure 1E:
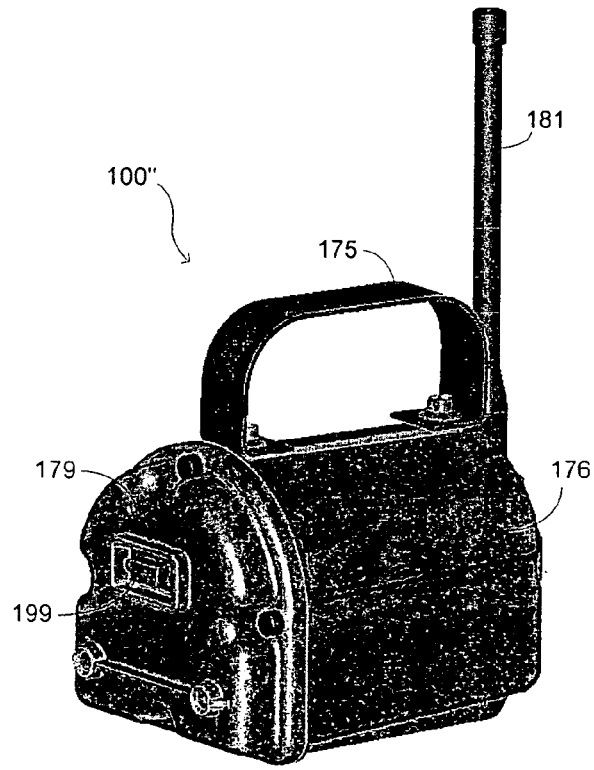
FIG. 1E provides a view of the data acquisition unit of FIG. 1D in an assembled state.

Another configuration for a data acquisition unit 100" that illustrates a specific structure in one embodiment is provided in FIGS. 1D and 1E, which respectively show an exploded view and a perspective view of such a data acquisition unit 100". The unit comprises a housing 176 within which the electronic elements described in connection with FIGS. 1A and 1B, and configured as part of circuit board 172, may be housed. Power for the unit is provided with a battery pack 177 that is also maintained within the housing 176, allowing the unit to operate independently as a stand-alone unit to collect data. The unit is closed with end cap 179 and gasket 180 to provide the unit as a closed structure, with each end of the assembled structure including connectors that allow interfacing with other components as indicated in FIG. 1A. For example, the data acquisition unit 100" may comprise an antenna connector 174 for interfacing with an antenna 181 used in detecting the ambient signals as described herein. The data acquisition unit 100" may also comprise a geophone connector 173 to allow the unit to be connected with a geophone that detects the seismic signals to be measured and recorded. The unit may also include connectors to allow current to be provided for recharging the battery pack 177 and for downloading of data collected by the independent unit. In one embodiment, these functions may be performed by an integrated data and charge connector 199. For instance, in one embodiment, the data exchange may be enabled by a USB connector comprised by the data and charge connector 199, such as shown in FIG. 1B. A handle 175 may be provide to simplify carrying the data acquisition unit 100".

Figure 1F:
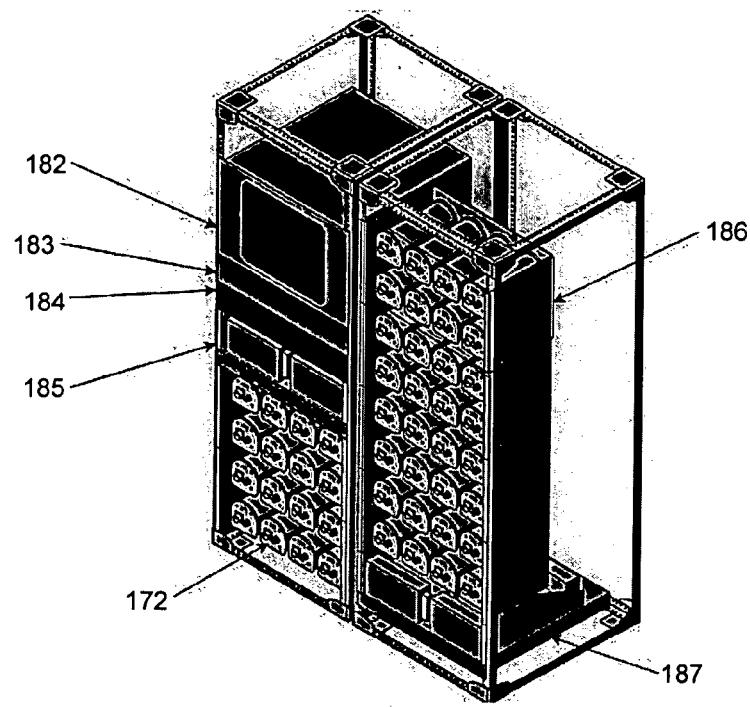
FIG. 1F provides a view of a data offload and charging rack used in an embodiment of the invention with the data acquisition unit of FIG. 1E.

The data collected independently by a plurality of the data acquisition units 100 may be conveniently be retrieved for multiple units with a structure like the one shown in FIG. 1F. In addition to being configured to permit downloads of data from multiple units simultaneously, the structure may in some embodiments also be configured simultaneously to charge the units as a combined data offload and charger system. In the exemplary embodiment shown in FIG. 1F, the data acquisition units are shown having the physical structure of units 100" illustrated in FIGS. 1D and 1E, with the antennas 181 and handles 175 removed to make packing multiple units more compact. Each of the multiple units 100" docked at a station within a frame 186, each station including a connector adapted to interface with the data and charge connector 180 comprised by the unit 100". The recorded seismic data are downloaded through the data and charge connector 180 and fed to a host computer 183 through a USB or other suitable communications interface. The host computer 183 may be connected with a monitor 182 and/or keyboard, mouse, or other input device positioned on a keyboard tray 184 to allow a technician to monitor the data being retrieved and issue commands in accordance with software running on the host computer 183. The monitor 182 and/or keyboard tray 184 may conveniently be provided within the frame 186 of the structure to keep the retrieval system compact. A power supply 185 may be provided for the host computer 183 and, at the same time, a power supply 187 may be provided to recharge the interfaced data acquisition units 100". Simultaneous retrieval of data from a plurality of data acquisition units and recharging of those units allows an efficient combination of functions. This efficiency may be especially valuable in cases where the number of data acquisition units is relatively large, a circumstance that is expected to be common in collecting seismic data with the independent units of the invention.

Figure 1G:
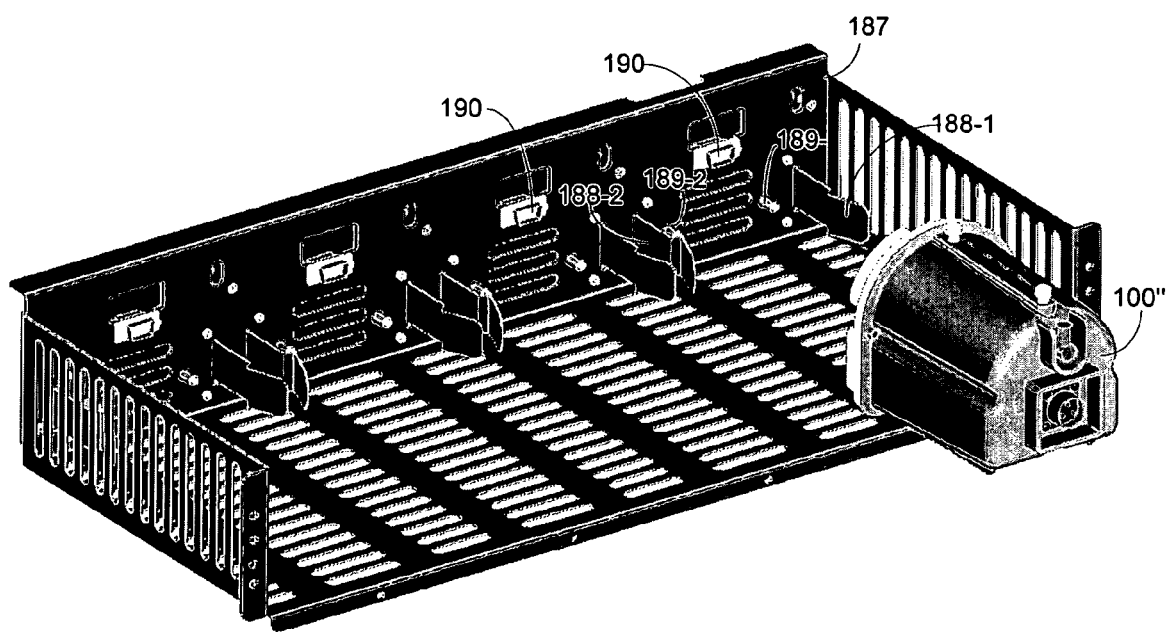
FIG. 1G provides a detailed illustration of a portion of the data offload and charging rack of FIG. 1F.

A more detailed view of a structure of the interface between the data acquisition units 100''' and the stations of the data offload and charger system is provided in FIG. 1G. At each station, the frame 187 may support a communications port 190, with proper alignment of the data acquisition unit 100''' being maintained by brackets 188 and pins 189. Merely by way of example, the communications port 190 may be provided as a DB-9 connector, the wires of which hold a USB circuit and a battery recharge circuit. The pins 189 help ensure proper alignment of the data acquisition unit 100" before a corresponding DB-9 connector comprised by the data acquisition unit 100" makes contact with a wall of the frame 187.

Figure 1H:
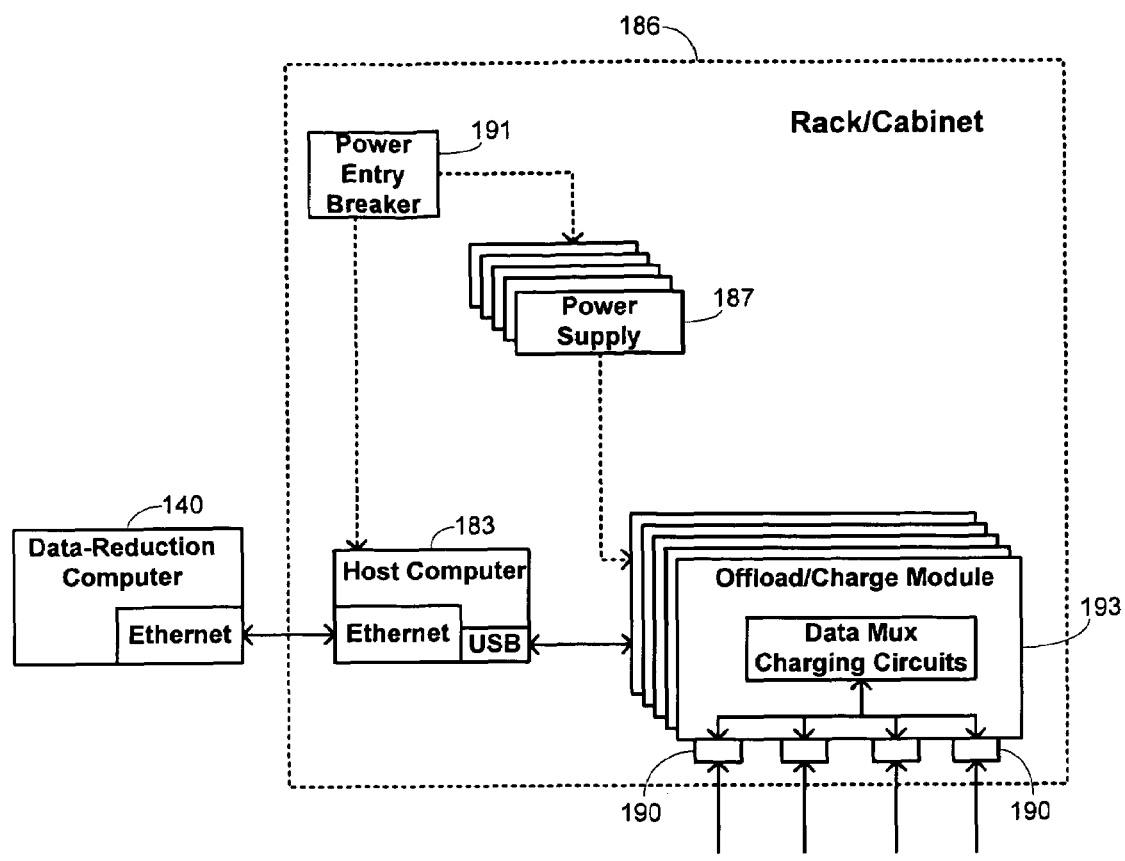
FIG. 1H is a schematic diagram showing a structure of the data offload and charging rack of FIG. 1F.

The functional structure of the data offload and charger system is illustrated schematically in FIG. 1H. As shown, the stations configured for interfacing with the data acquisition units 100" may be provided as a plurality of integrated offload/charge modules 193, each of which is configured to interface with a plurality of data acquisition units through ports 190. The offload/charge modules 193 may each include a data multiplexer to combine data received from each of the data acquisition units 100" and charging circuits to provide recharge energy to the data acquisition units 100" as provided by the power supply 187. Conceptually, the recharge energy and the data flow in opposite directions through the offload/charge modules 193. Data flows into those modules 193 from the data acquisition units 100" and is directed to the host computer 183; recharge energy from the power supply 192 flows though the modules from the power supply 192 and is directed to the individual data acquisition units. Flow of recharge energy may be regulated by a power entry breaker 191. In some instances, microprocessor code that handles the data-download portion of the data acquisition unit may reside on the data offload and charging unit. In such instances, when a data acquisition unit is connected with the data offload and charging unit, the boot EEPROM containing the field code is disconnected, allowing the data offload and charging unit to offload code into the data acquisition unit.

The host computer 183 may be provided in communication with a data-reduction computer 140, with the retrieved data being provided from the host computer 183 to the data-reduction computer over a communications link such as an ethernet link. The existence of such a communications connection is indicated more generally in FIG. 1A with data link 136. In some embodiments, a plurality of data offload and charger systems may be provided, each of them having a host computer 183 in communication with the data-reduction computer 140 to provide the data link 136. In other embodiments, the data link may take other forms including, for example, a wireless network, infrared connection, hardware connection, or the like.

Figure 2:
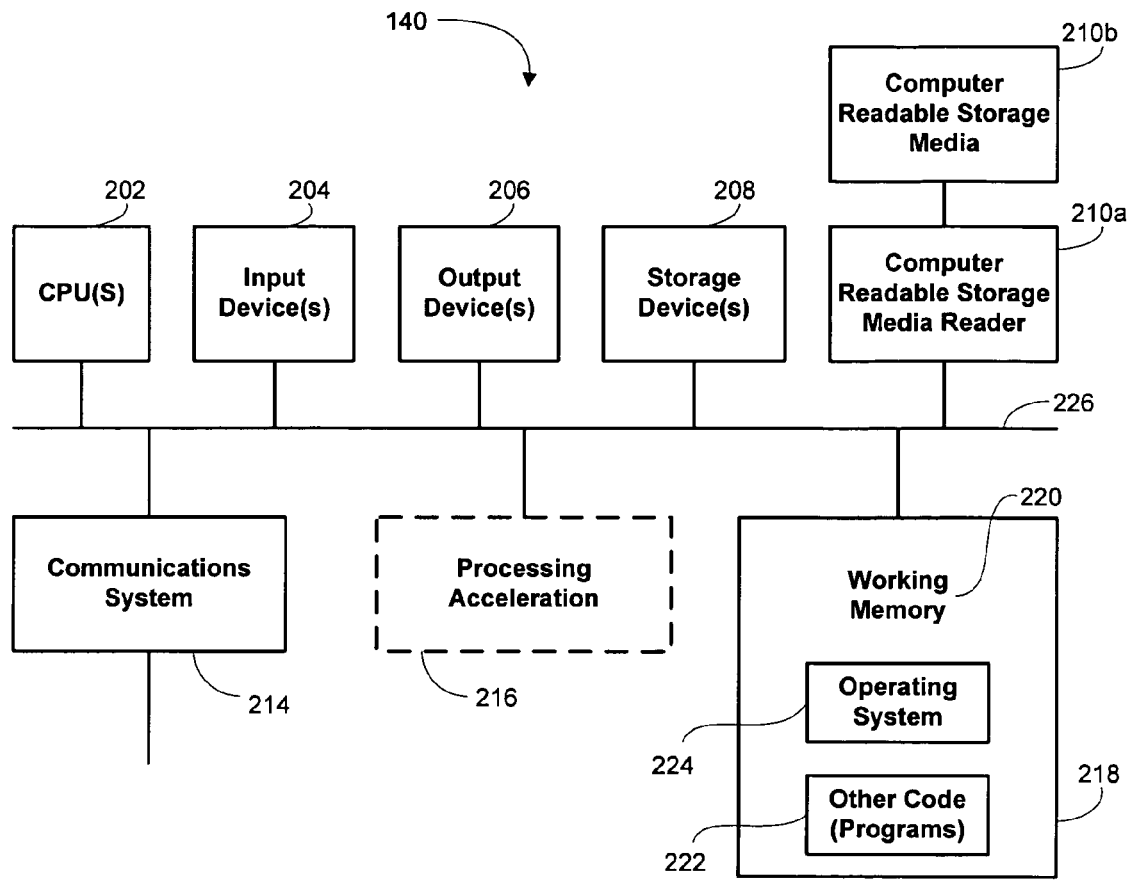
FIG. 2 provides a schematic illustration of a data-reduction computer on which methods of the invention may be embodied.

FIG. 2 provides a schematic illustration of a structure of the data-reduction computer 140 that may be used to implement analysis of data received from the processing units 124 of multiple data acquisition units 100. FIG. 2 broadly illustrates how individual system elements may be implemented in a separated or more integrated manner. The data-reduction computer 140 is shown comprised of hardware elements that are electrically coupled via bus 226, including a processor 202, an input device 204, an output device 206, a storage device 208, a computer-readable storage media reader 210a, a communications system 214, a processing acceleration unit 216 such as a DSP or special-purpose processor, and a memory 218. The computer-readable storage media reader 210a is further connected to a computer-readable storage medium 210b, the combination comprehensively representing remote, local, fixed, and/or removable storage devices plus storage media for temporarily and/or more permanently containing computer-readable information. The communications system 214 may comprise a wired, wireless, modem, and/or other type of interfacing connection and permits data to be exchanged with the data link 136 for collection of data to be processed from multiple data acquisition units 100.

The data-reduction computer 140 also comprises software elements, shown as being currently located within working memory 220, including an operating system 224 and other code 222, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 3A:
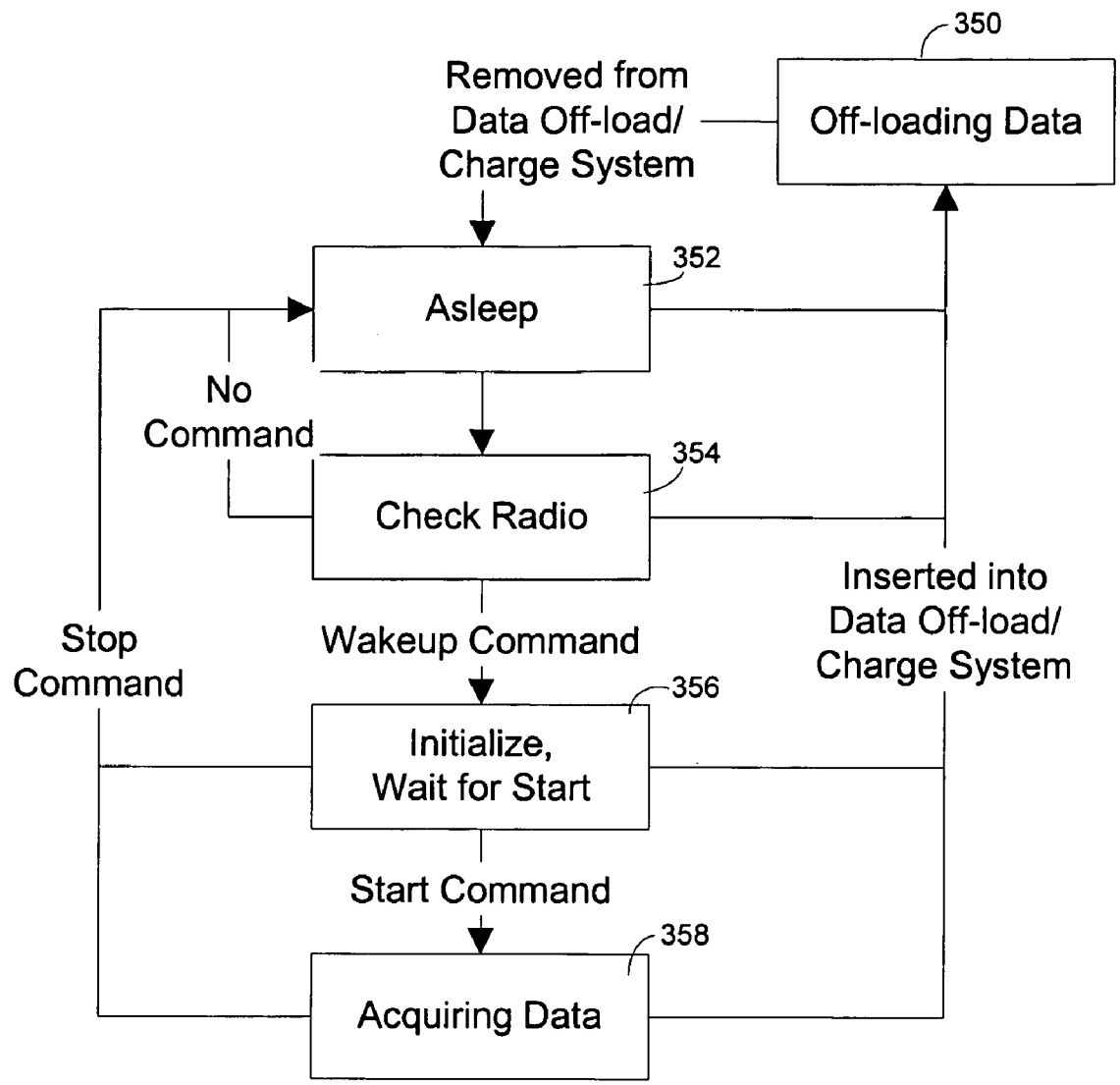
FIG. 3A provides a flow diagram summarizing operation of a data-acquisition unit in an embodiment of the invention.
Figure 3B:
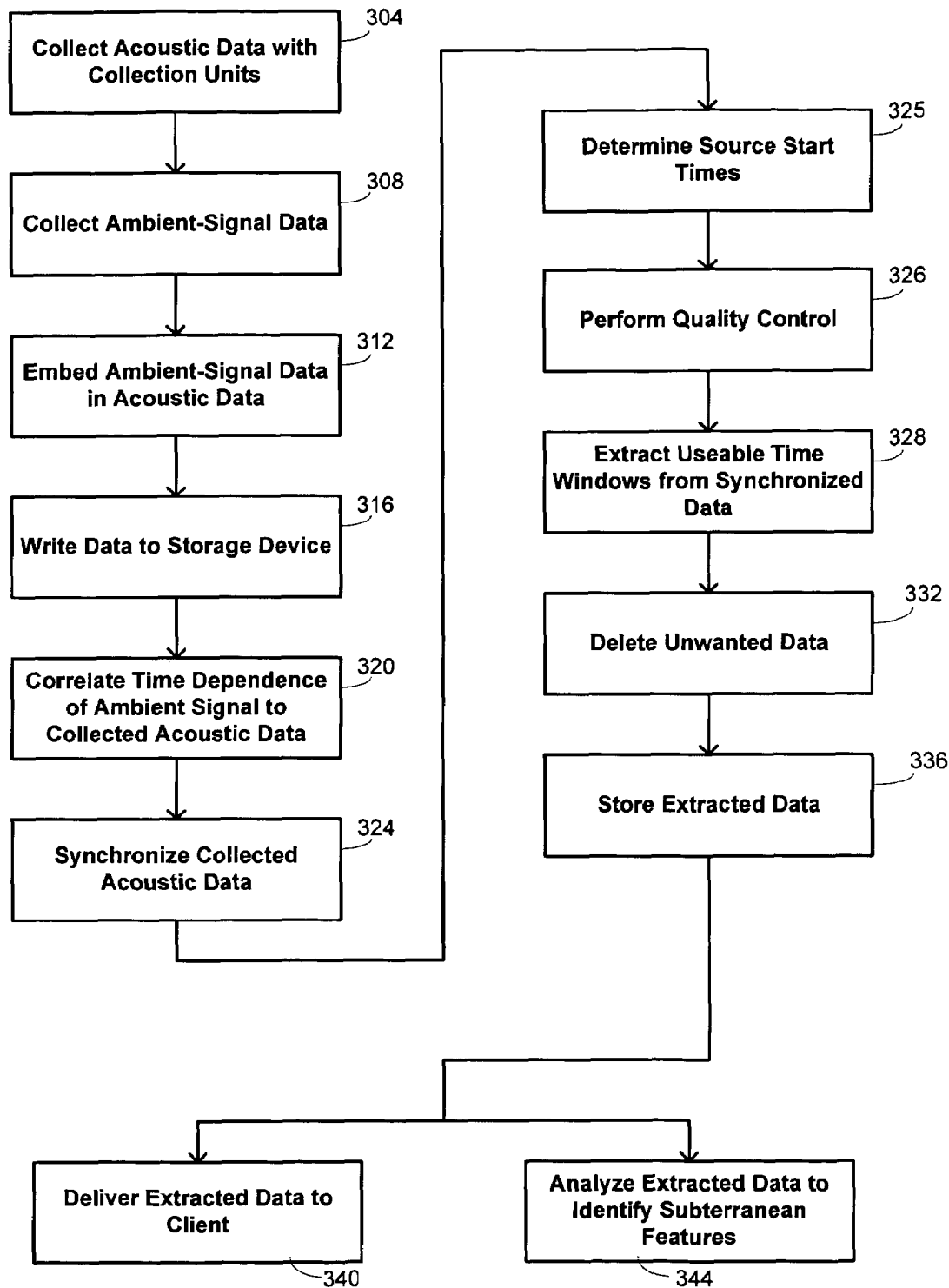
FIG. 3B provides a flow diagram summarizing methods for acquiring seismic data in accordance with embodiments of the invention.

A high-level overview of the operation of each data acquisition unit is illustrated with the flow diagram of FIG. 3A. FIG. 3B described below illustrates how the system as a whole, with a plurality of data acquisition units, is used in acquiring seismic data in embodiments of the invention. As part of a power-saving scheme, the data acquisition unit may spend significant time in a sleep state, as indicated generally by block 352. In typical field operation, an external wakeup clock wakes the unit periodically so that it may check the radio at block 354 for a DTMF code. If no wake-up command is received, the unit goes back to sleep. If a wake-up command is received, the unit prepares for data acquisition at block 356 by initializing and waiting for a start command. Upon receipt of a start command, the unit acquires data at block 358 until a stop command is received, at which point the unit goes back into a sleep state. Later, data may be offloaded from the data acquisition unit at block 350 by inserting the unit into the data offload and charger system such as illustrated in FIG. 1F.

Methods using a plurality of data acquisition units to acquire seismic data in embodiments of the invention are summarized with the flow diagram of FIG. 3B. The order of the blocks shown in FIG. 3B is exemplary and is not intended to be construed as an order in which functions need be performed; in alternative embodiments, the functions indicated in FIG. 3B may be performed in a different order. At block 304, acoustic data are collected with the data acquisition units 100, such as described in connection with FIG. 3A. If the units 100 are not already distributed within a survey area, such collection may begin with distribution of the units 100 over the survey area by one or more installers. Typically, the installer will record a serial number identifying each of the units 100 distributed and the location where it is distributed. Such installation may be facilitated with a handheld computational device having a communications port for communicating with the data acquisition unit 100, such as a personal-digital assistant ("PDA"). When the data acquisition unit 100 is positioned, the installer may enter instructions on the handheld computational device to instruct the data acquisition unit 100 as to mode of operation, i.e. whether it is to operate continuously, respond to signals of predetermined vibrations, to transmit data or store data locally as they are collected, the type of ambient signals to detect and record, and the like. In some instances, the installer may record additional information about each data acquisition unit 100 such as a status of the unit 100 when it is positioned.

With the data acquisition units 100 distributed over the survey area, they each collect acoustic data and ambient-signal data in accordance with their instructions at blocks 304 and 308. If the state of the data acquisition unit 100 indicates that the ambient-signal data are to be embedded with the acoustic seismic data, such embedding is performed at block 312, usually in accordance with programming instructions of the processing unit 124. In one embodiment, the embedded data corresponds to a superposition of the ambient-signal data with the acoustic seismic data in a fashion that preserves their time dependence. In this way, to the extent that features from the ambient signal remain identifiable, they may be directly synchronized with the acoustic seismic data in which they are embedded. Furthermore, when such features remain identifiable in the data collected by a plurality of the data acquisition units 100, they allow synchronization among the separate sets of data. In other embodiments, the collected ambient signal might be retained separately from acoustic seismic data signals; such separately retained signals may still be used for synchronization if their relative time dependencies are maintained for each of the data acquisition units 100. Embedding the signals, however, has the advantage of ensuring ab initio that information defining such relative time dependencies is preserved.

Each acquisition by the data acquisition units may be contained in a record, which may be in the form of discrete files or in the form of delimited sections of a large data file. In one embodiment, the record is comprised of record entries, which identify analog-digital samples, acquisition number commands, and time tick tokens. Each record entry is generally stored in the record in the order it is received. A record entry may be an analog-digital sample unless a token signal byte is detected in the record entry. Its value may depend on the previous sample value. If the previous sample is greater than or equal to zero, the token signal byte is 80h (128d). If the previous sample is less than zero, the token signal byte is 7Fh (127d). Such a change signals a token because the analog-digital converter imposes a bandwidth limit on the data signal that precludes the possibility that a sample of 80XXXXh could ever follow a positive sample and a sample of 7FXXXXh could never follow a negative sample. Subsequent tokens without interceding samples have the same token signal byte.

In this embodiment, the byte following the token signal byte is the token identification byte, which identifies the information and size of the following data bytes, such as illustrated with the following table:

| Token Signal Byte | Token Identification Byte | Data Byte(s) |
|---|---|---|
| 7Fh or 80h, depends on the preceding sample | Identifies the type of token | A number of data bytes that correspond to the token type. |

Possible token identification bytes and their corresponding functions and number of data bytes are shown for an embodiment in the following table:

| Token Identification Byte | Token Type | Number of Data Bytes | Description |
|---|---|---|---|
| 08h | Acquisition Number | 2 | The number indicated by the acquisition number command |
| 00h-03h | Time tick envelope (rising edge) | 1 | An 8-bit count that indicates the delay between a sample and the edge |
| 04h-07h | Time tick envelope (falling edge) | 1 | An 8-bit count that indicates the delay between a sample and the edge |
| 09h | DTMF digit received | 1 | A number indicating which digit was received |
| 0Ah | Message/error code | 1 | An 8-bit code indicating unit status |
| 0Bh | Debug Text | Variable | A null-terminated string |
| 0Ch-FFh | Reserved | | |

Irrespective of whether the data signals are embedded with each other, the data may be written to a storage device at block 316. For each data set, the analysis begins by correlating the time dependence of the ambient signals to the collected acoustic seismic data at block 320 and then synchronizing the multiple data sets at block 324. Source start times are determined at block 325. The correlation and synchronization functions are greatly simplified in embodiments where the ambient and seismic signals have been embedded with each other since such embedding preserves the time correlations between them. Preservation of such time correlations permits synchronization to proceed at block 324 by identifying unique features from the ambient signal in each of the combined seismic/ambient signals. In some instances, one unique feature may be sufficient to perform the identification, but it may be desirable to use multiple features for synchronization where the signal variation is complex or to increase confidence levels in the synchronization. One of the combined signals may be selected as a baseline signal defining a canonical time sequence. Each of other combined signals may then be shifted in time so that the selected identification feature(s) match their occurrence in the canonical time sequence. In some embodiments, the determination of time shifts is facilitated by calculating cross-correlation functions to identify times of maximal correlation. Such time shifts may occur in either the positive or negative direction depending on the specific signal chosen to define the canonical time sequence and depending on the specific variations of the other signals.

In some instances, synchronization may also include application of a compression or expansion factor to the time sequence of given signals. It is generally expected that the need for compression or expansion of a time sequence will be rare, but it may be appropriate if circumstances have caused the rate of recordation of some signals to differ from the rate of other signals. In such instances, simple linear time translation of the signals may be insufficient to match multiple identification features from the ambient signal to the canonical time sequence. Application of a compression or expansion factor may be viewed as a mapping $f(t) \rightarrow f(\alpha t)$, where $\alpha > 1$ corresponds to a compression and $\alpha < 1$ corresponds to an expansion for embedded ambient/seismic signal $f(t)$.

For example, suppose that the set of embedded signals received by the data-reduction computer 140 is denoted $f_i(t)$. The canonical time sequence may be defined by a particular one of these signals, say $f_0(t)$. Supposing that identification features may be identified at a set of time intervals $\{\Delta t_j\}$, synchronization may proceed by finding $\alpha_i$ and $\delta_i$ so that these features are reproduced at these same time intervals $\{\Delta t_j\}$ in each of $f_i(\alpha_i t - \delta_i)$.

Essentially the same techniques may be used when the ambient-signal data have not been embedded with the acoustic seismic data. Since both data sets for a given data acquisition unit 100 were collected substantially simultaneously and with a single data acquisition unit 100, however, the time correlation between the two is not expected to involve compression or expansion of the time dependence. Instead, a particular time value is assigned as a common time origin for both the seismic data and for the ambient data for each respective data acquisition unit 100. Calculations to effect the synchronization may then initially be performed solely on the ambient-signal data, with time shifts and compression/expansion factors being determined for data from each data acquisition unit 100 to time-align identification features of the ambient-signal data. These respective shifts and compression/expansion factors may then be applied to the corresponding seismic data to complete the synchronization.

For example, suppose the set of seismic data is defined by $S_i(t)$ and the set of ambient data is defined by $A_i(t)$ according to respective time origins. Synchronization may then be performed on the set of $A_i(t)$ in a fashion similar to that for $f_i(t)$ described above, with a canonical ambient signal $A_0(t)$ being chosen and factors $\alpha_i$ and $\delta_i$ being determined to match a set of identification features over the set of time intervals $\{\Delta t_j\}$. These determined factors may then be applied to the seismic data to produce a set of pure synchronized seismic signals $S_i(\alpha_i t - \delta_i)$ for use in subsequent analysis.

In some instances, the subsequent analysis may make use of only selected portions of the synchronized data, such as portions of the data within certain time intervals surrounding known source events. Accordingly, at block 326, a quality-control procedure may be used to ensure that data used in the analysis meet predetermined quality levels and are unlikely to represent spurious results. At block 328, the useable time windows are extracted from the synchronized data sets. Identification of the useable time windows may be performed by software in the data-reduction computer 140 to note source event times, such as collected at block 302, and to select regions having specific time intervals about synchronized correspondences to such source event times. The unwanted data may then be deleted at block 332. Deletion of such data may be appropriate where the data are to be used only for analysis to identify subterranean features. In other instances, the data may be used for other purposes that may make it desirable for the full data set to be retained. Some examples of such applications are discussed below. In some embodiments After processing, the data may be stored on a mass storage device as indicated at block 336. In addition, it may be delivered to a client who has paid for collection and preparation of the data at block 340, or may be subjected to further analysis as indicated at block 344 to identify subterranean features. Techniques for such analysis using synchronized data are known to those of skill in the art and may include a variety of processing and acoustic reconstruction techniques. In one embodiment, the analysis makes use of an acoustic holographic technique. An early example of a description of acoustic holography is provided generally in U.S. Pat. No. 4,070,643, entitled "ACOUSTIC HOLOGRAPHY APPARATUS," the entire disclosure of which is incorporated herein by reference for all purposes, although other acoustic-holographic techniques that may be applied to the synchronized seismic data will also be known to those of skill in the art.

FIGS. 4A-4E provide examples of acoustic-data traces to illustrate effecting synchronization with the ambient-signal information. In embodiments where the ambient signal corresponds to a commercial broadcast signal, such as a radio-program or television-program signal, there may be characteristics in voice patterns or other variations over certain time intervals $\{\Delta t_j\}$ that may be used as the identification features. The inventors have found, for example, that the voices of certain speakers have frequency characteristics that make them especially suitable for providing identification features against seismic acoustic data, particularly among speakers with voices in the low end of the normal human frequency range.

Figure 4A:
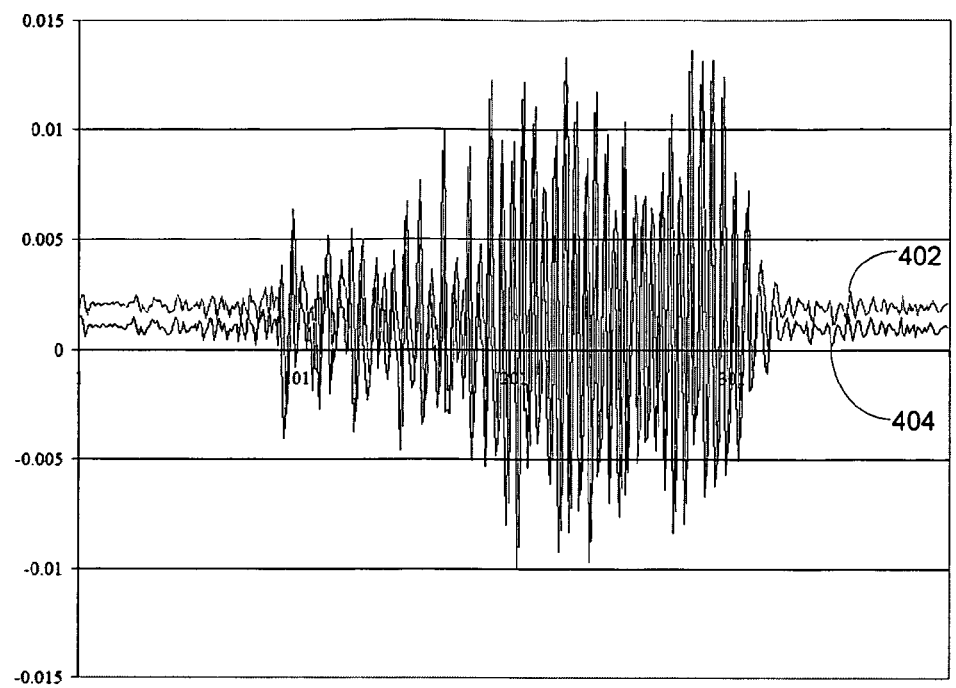
FIGS. 4A-4E provide exemplary acoustic traces illustrating aspects of synchronization techniques used in embodiments of the invention.

To illustrate the ability to use voice patterns as identification features, FIG. 4A provides an example of a human-voice signal recorded with two different data acquisition units 100, respectively designated 402 and 404. The signal is from a popular motivational speaker often heard on television and radio who has a low-frequency voice of the type that the inventors have identified as particularly suitable for use in synchronization according to embodiments of the invention. While the general behavior of the voice signals is clearly seen to be similar from FIG. 4A, actual matching of the time sequences for them may be facilitated through known correlation-evaluation techniques, such as through calculation of a cross-correlation function. For two functions $V^{(1)}(t)$ and $V^{(2)}(t)$, such as the voice functions shown in FIG. 4A but generally applicable to any of the ambient-signal data or combined ambient/seismic-signal data discussed above, the cross-correlation C at delay $\delta$ is $$C(\delta) = \frac{\int dt (V^{(1)}(t) - \langle V^{(1)} \rangle)(V^{(2)}(t-\delta) - \langle V^{(2)} \rangle)}{\sqrt{\int dt (V^{(1)}(t) - \langle V^{(1)} \rangle)^2} \sqrt{\int dt (V^{(2)}(t-\delta) - \langle V^{(2)} \rangle)^2}},$$

where $\langle V^{(1)} \rangle$ and $\langle V^{(2)} \rangle$ are respectively the mean of $V^{(1)}(t)$ and $V^{(2)}(t)$. The value of $\delta$ at which the cross-correlation C is maximized corresponds to the time shift to be introduced in synchronizing $V^{(1)}(t)$ and $V^{(2)}(t)$.

Figure 4B:
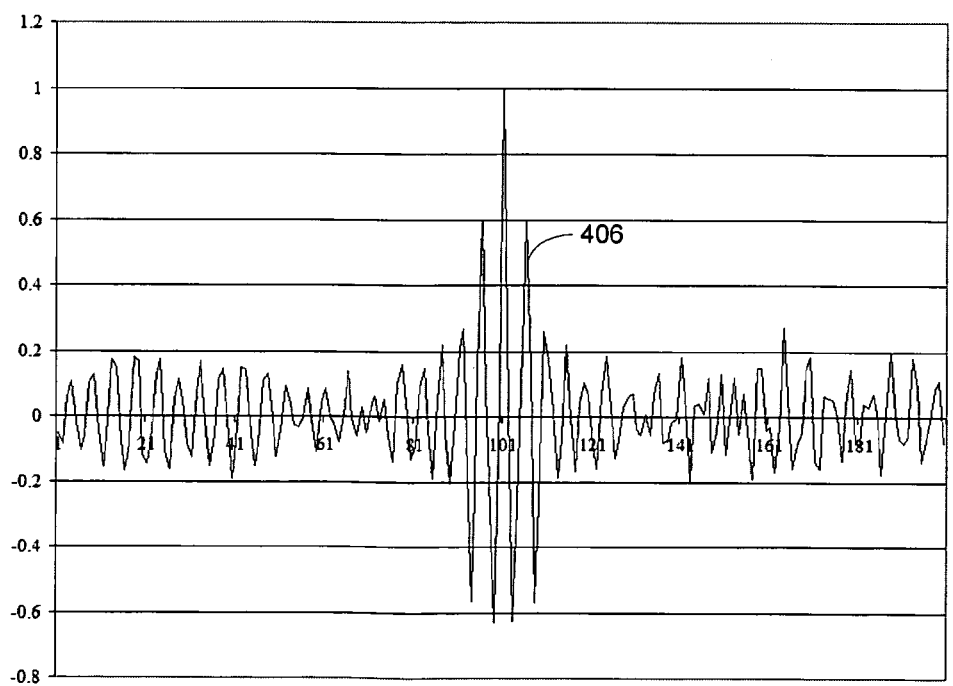

FIG. 4B provides the cross-correlation function 406 resulting from a calculation using the signals shown in FIG. 4A. Since the signals 402 and 404 in FIG. 4A are substantially properly aligned, the maximal correlation value falls approximately in the center of the window. If the signals did not match and required a time shift for synchronization, the maximal correlation value would be offset by an amount $\delta$, which would then be used as described above in providing the synchronized signals.

Figure 4C:
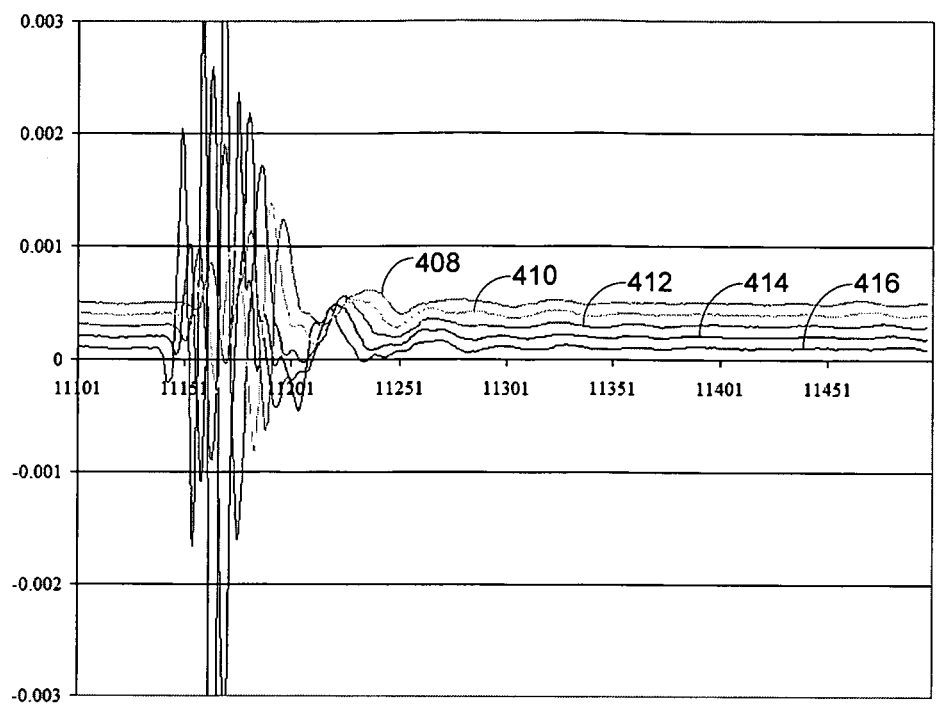
Figure 4D:
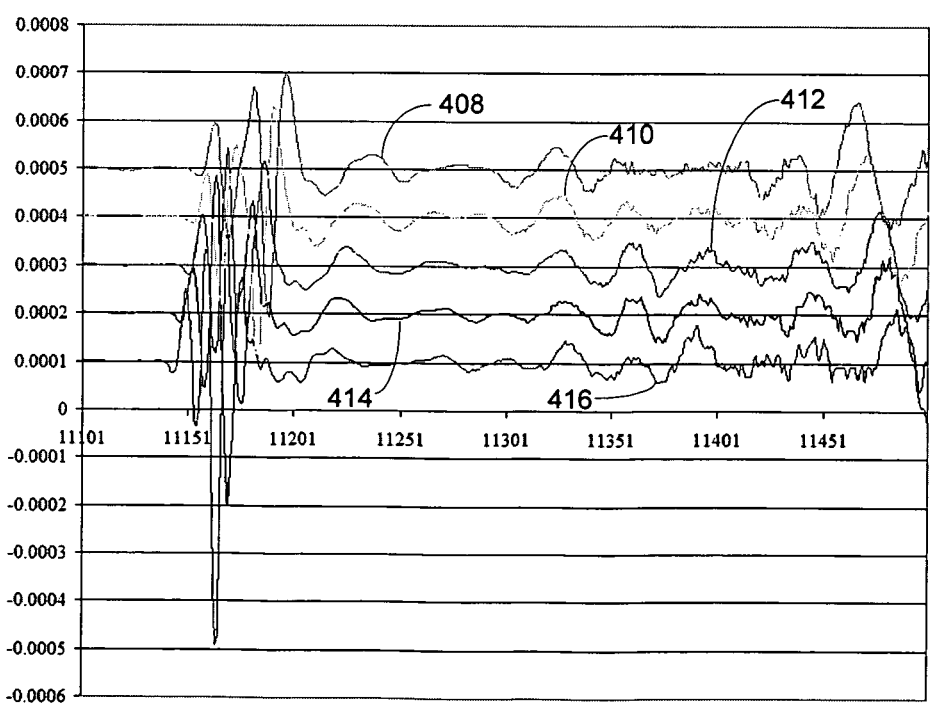

The inventors have tested application of this technique with actual seismic data, with results shown in FIGS. 4C and 4D. The traces in FIG. 4C are displayed in true amplitude and the traces in FIG. 4D reflect the application of an automatic gain control. The traces are offset by amounts from the surveyed ground locations, with trace 408 being offset by 25 feet, trace 410 being offset by 20 feet, trace 412 being offset by 15 feet, trace 414 being offset by 10 feet, and trace 416 being offset by 5 feet. The traces have been synchronized using the techniques described above. The apparent offset, from bottom-to-top and from left-to-right, thus reflects a real physical change that provides information about the area being surveyed. In this instance, this physical change corresponds to differences in travel times resulting from the increase in offsets between the source and data acquisition units 100. A velocity derived from differences in the trace offset divided by differences in arrival time is very close to the speed of sound in air, about 1100 ft/s. In cases where the acoustic signals are received from the Earth, the differences in the synchronized curves provide structural information about subterranean objects, such as hydrocarbon-gas or oil deposits. In one set of embodiments, such information is derived from acoustic signals received from inside the Earth.

Figure 4E:
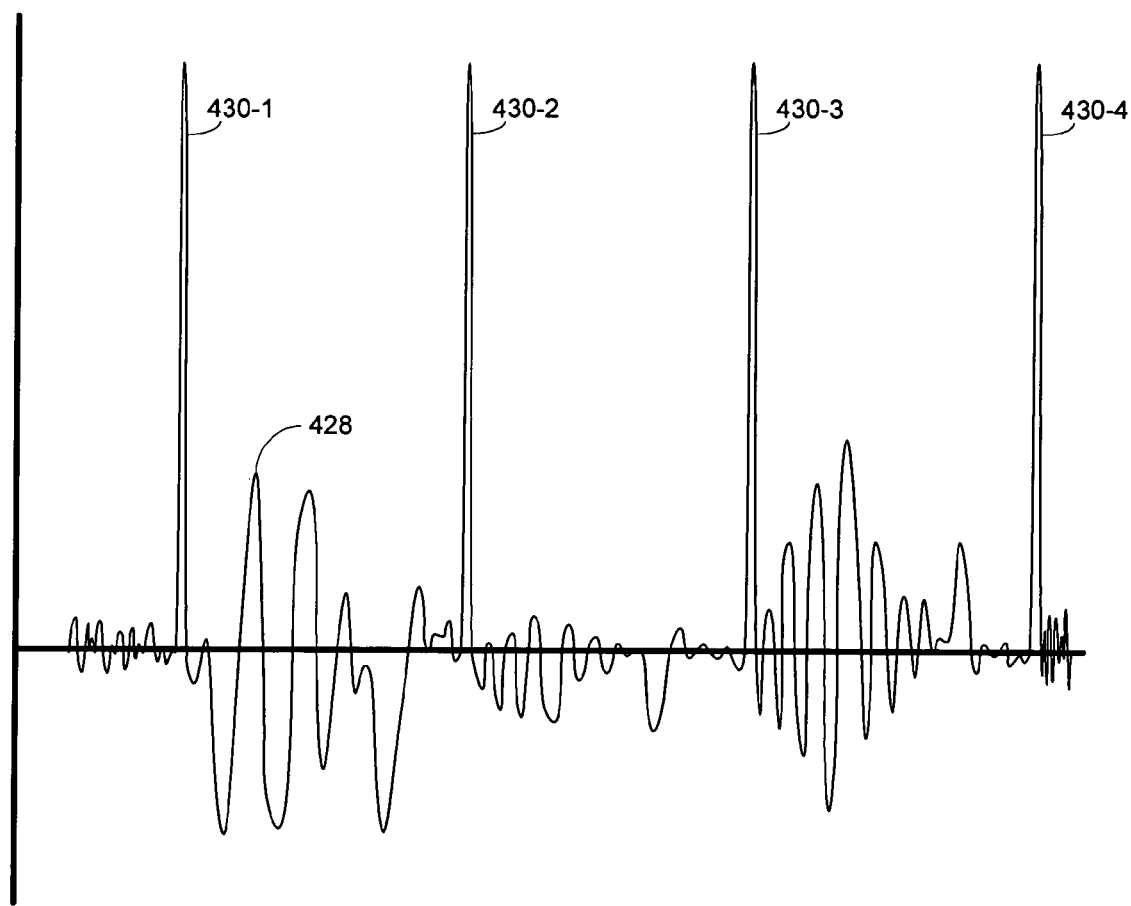

The voice signals of FIG. 4A are examples of irregular signals that may be used in synchronization. FIG. 4E provides an example of regular signals 430 derived from an ambient signal, with those signals embedded in seismic acoustic data 428 measured by one of the data acquisition units 100. Such regular signals may result from ambient signals that correspond, for example, to GPS time signals, Universal Synchronized Time broadcast signal, and the like. The regularity of such ambient signals 430, particularly when their amplitude is sufficient to swamp the seismic acoustic signals 428, permits them to be used in synchronization without the use of cross-correlation calculations. In particular, the well-defined nature of such signals permits the time intervals $\{\Delta t_j\}$ to be very narrow, with precise central time values. Accordingly, in some embodiments, synchronization is performed with regular ambient signals directly, while in other embodiments synchronization, even with regular ambient signals, may still be performed with a cross-correlation technique.

Figure 5A:
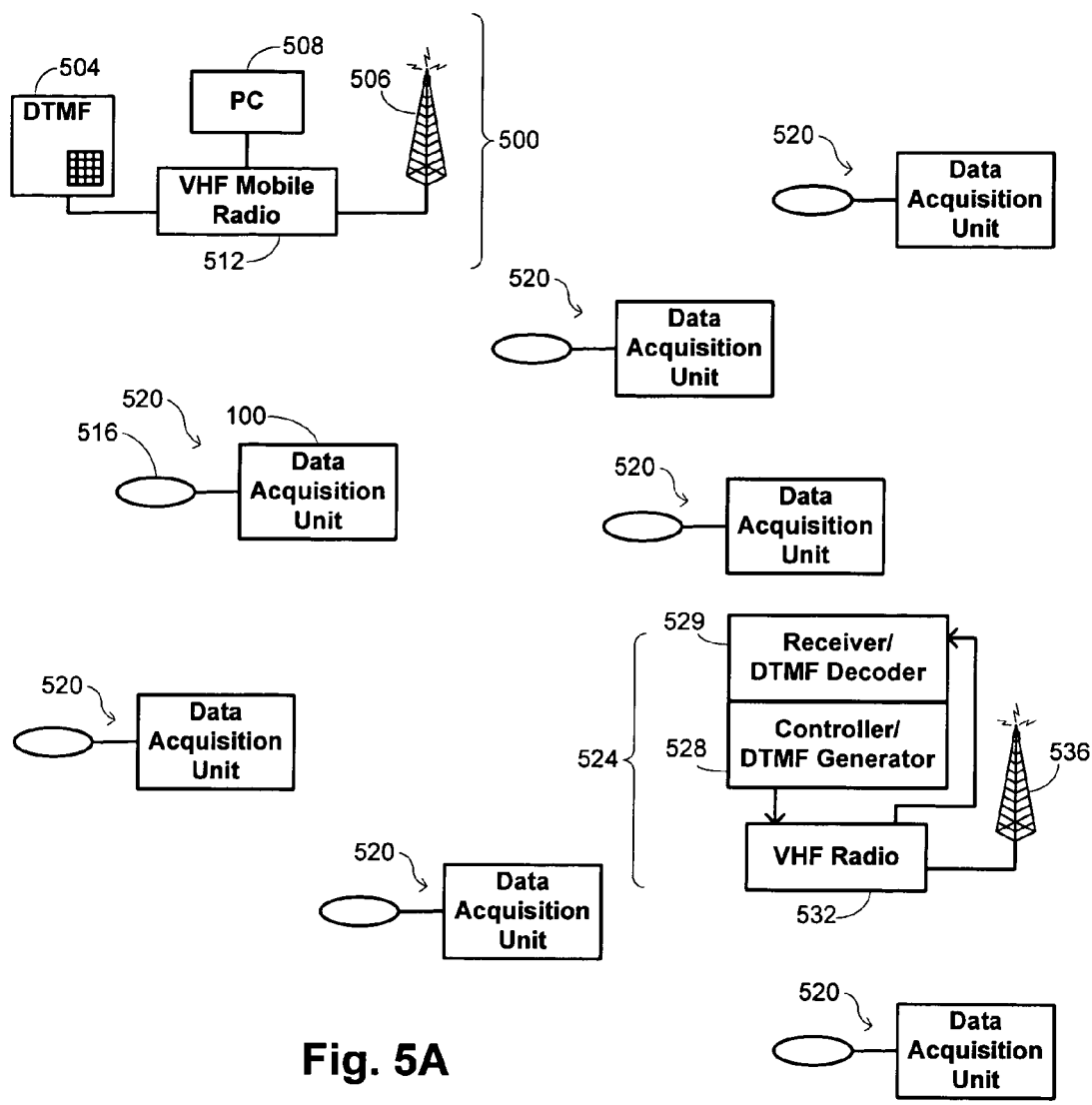
FIG. 5A provides a schematic illustration of a seismic-data collection system that uses a transmitter/repeater configuration.

In still other embodiments, the ambient signal may be provided by an arrangement that comprises a transmitter and one or more repeater stations, as illustrated schematically in FIG. 5A. In this embodiment, a plurality of collection systems 520, each of which comprises a data acquisition unit 100 and a geophone 516, are distributed over the survey area. The ambient signal is generated initially by a transmitter system 500, which may comprise a transmitter antenna 506. In one embodiment, signals provided for transmission by the transmitter antenna 506 take the form of dual-tone multiple-frequency ("DTMF") signals, which may be generated by a DTMF system 504. As is known in the art, DTMF signals each comprise a first tone (usually one of 697, 770, 852, or 941 Hz) and a second tone (usually one of 1209, 1336, 1477, or 1633 Hz). In cases where each of the two tones is one of four specific frequencies, the number of distinct tone combinations is sixteen. In the embodiment shown in FIG. 5A, the DTMF signals are routed to the transmitter antenna 506 with a very high-frequency ("VHF") mobile radio 512, which may itself be controlled by a local computer 508. The local computer 508 may be provided as a laptop or other portable computational device in some embodiments, and may also control the press-to-talk ("PTT") function of the radio. While in some embodiments, the DTMF board may be operated by the local computer 508, in other embodiments an operator may push a DTMF keypad to send commands. The transmitter preferably provides at least 35 W of output power in order to easily cover a ten-mile range.

The general layout of the survey area and the presence of obstructions may result in some of the data acquisition units being outside the range of the transmitter. Accordingly, one or more repeater stations 524 may be distributed to provide coverage throughout the survey area. The repeater stations are generally placed within a line of sight from both the transmitter 500 and obscured data acquisition units 100. The repeater stations operate on the same frequency as the transmitter 500. Each repeater 524 includes a repeater antenna 536 coupled with a VHF radio 532, whose operation is managed by a controller 528 and which provides signal to a DTMF decoder 529. Each repeater station 524 thus receives DTMF digits from the transmitter 500 and retransmits these commands using a unique fixed delay and DTMF sync digit. The PTT function is actuated prior to the DTMF being sent and is disabled some time later, such as about 750 ms later in one embodiment. A repeater number may be set by DIP or SMT switches. Synchronization of data collected in this fashion may be performed in the same manner described in detail above for other types of ambient signals. In particular, data from a plurality of data acquisition units may be retrieved simultaneously with a data offload and charger system like the one described in connection with FIG. 1F, with that system also being used conveniently at the same time to recharge the data acquisition units for use in subsequent data-collection projects.

Figure 5B:
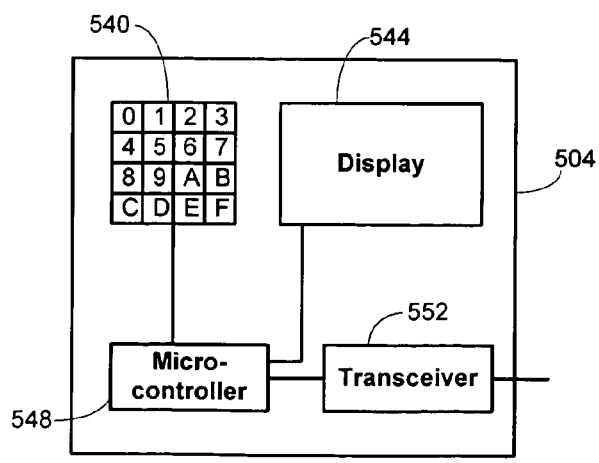
FIG. 5B is a schematic diagram illustrating a structure of a DTMF board used in one embodiment with the transmitter/repeater seismic-data collection system of FIG. 5A.

FIG. 5B provides a schematic illustration of a structure that may be used for the DTMF system 504 in one embodiment. User-interface components may include a keypad 540 for entry of selected sequences of DTMF signals and a display 544 to provide information to the user. For purposes of illustration, the keypad is organized as a 4×4 grid, with each row corresponding to a different one of the first tones and each column corresponding to a different one of the second tones. The keypad 540 and display 544 are operated by a microcontroller 548 that is interfaced with a transceiver 552 that emits the specific sequence of DTMF tones selected by the user.

Figure 6A:
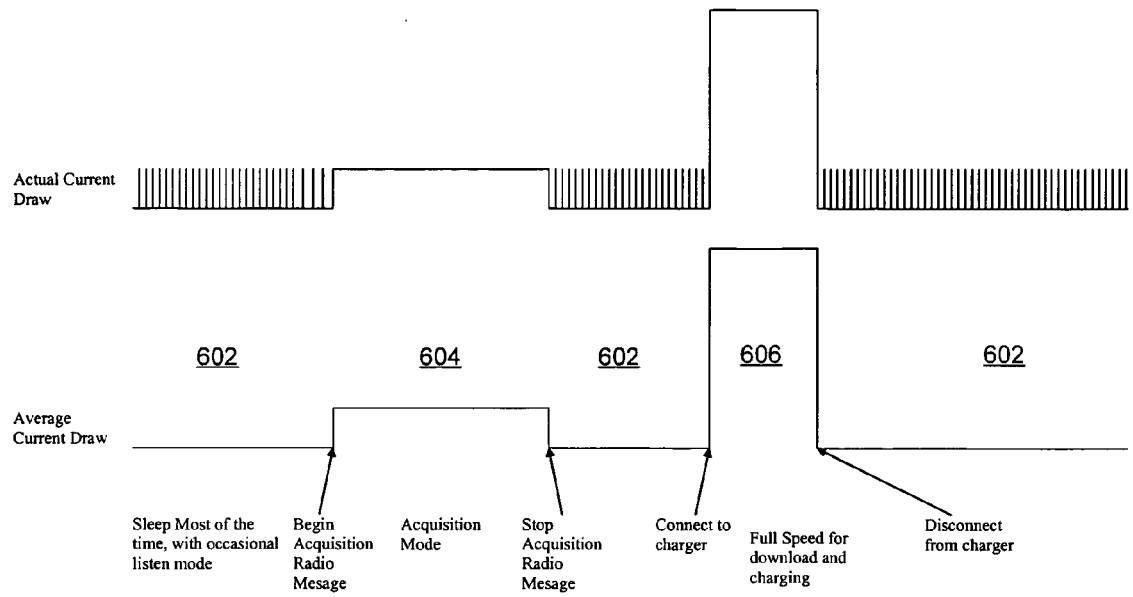
FIG. 6A illustrates a power-saving scheme for data-acquisition units in an embodiment of the invention.

The manner in which the data acquisition units are used with a prevalent sleep mode, waking in order to collect data as needed, permits significant power saving that greatly extends battery life. This is illustrated with FIG. 6A, which shows the power savings implemented by switching operation modes. The top curve of FIG. 6A shows the actual current draw, while the lower curve shows an average current draw. Each data acquisition unit is either in a sleep mode or recording in a listen mode, designated by reference number 602 so that the average current draw is generally low. This average increases upon receipt of an acquisition radio message that puts the unit into acquisition mode 604 where it is collecting data. After acquisition, the unit returns to sleep mode with brief listening interruptions 602. The greatest average current draw occurs when the unit is connected to the data offload and charging unit for full-speed downloading of data and simultaneous recharging of the unit.

Batteries comprised by the acquisition units are charged when connected to the USB through a specialized connector containing the USB signals and battery connections. This high-power mode comprises both charging the battery and offloading data, and the acquisition unit has all sections of its board powered because of the external power supplied by the data offload and charging unit. The power connection made when the data acquisition unit is plugged into the data offload and charging unit activates the high-power charge mode. In high-power mode, the high-power oscillator is used, the microprocessor is awake, and the compact flash is turned on.

Conversely, during low-power modes there may be at least two sections of the board that can be powered down. For instance, a first section may include the microprocessor, the analog-to-digital converter, the electromagnetic receiver, and other circuits; and a second section may comprise the memory, such as a compact flash module. These components have been described above generally in connection with FIG. 1B. In low-power mode, the processor puts itself to sleep but relies on a periodic assertion of the wake-up signal to be awakened from sleep.

A data acquisition unit in sleep mode has both sections of the board powered down. During this time, the unit consumes the minimum amount of current. The microprocessor wakes up when the wake-up signal goes high. In one embodiment, this signal may be activated about once every 1.5 minutes by a high wake-up pulse. A power-connection signal from the data offload and charging connector may also wake up the processor. A slight delay between the microprocessor sleep signal assertion and when the power supply to the oscillator is deactivated provides the microprocessor with enough clock cycles to put itself into sleep mode.

In one embodiment, insertion of the data acquisition unit into the data offload and charging unit activates the connection signal and causes the microprocessor clock to switch from a 1 MHz clock to a 24 MHz clock. The slow clock allows the unit to operate at lower power while the unit is deployed and running off of batteries, while the fast clock allows the unit to transfer data over the USB at a higher rate. When the microprocessor clock changes, external circuitry asserts the microprocessor's reset line until the new oscillator is stable.

Figure 6B:
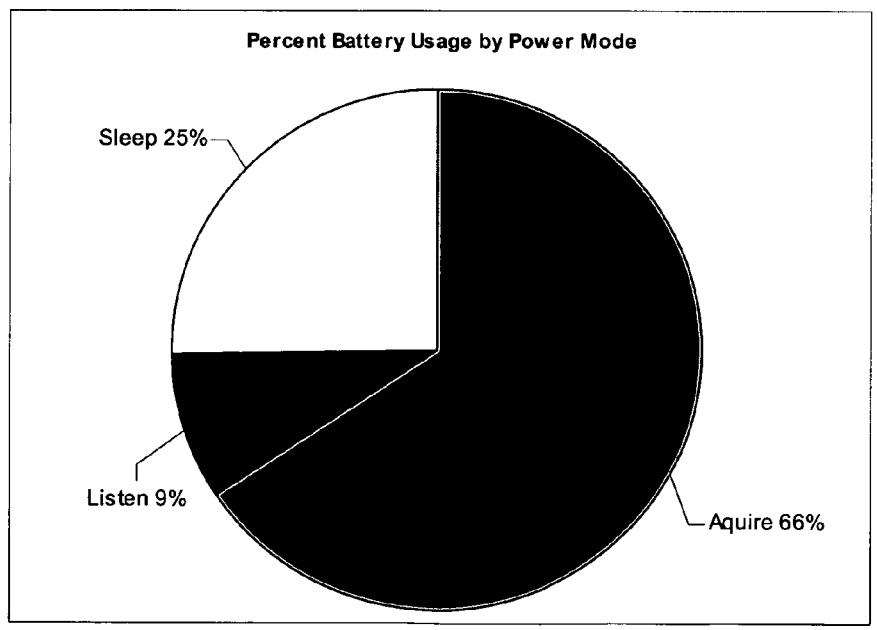
FIG. 6B provides a pie chart illustrating battery usage by a data-acquisition unit using the power-saving scheme illustrated in FIG. 6A.

FIG. 6B provides results of calculations performed by the inventors to illustrate battery consumption by the data acquisition units in each power mode. As the pie-chart diagram shows, 25% of battery power is consumed in sleep mode and 9% of battery power is consumed in listen mode, while the remainder of the battery power is consumed in acquisition mode. The ability to achieve 66% of battery-power consumption in acquisition mode shows that the power-saving arrangement results in high efficiency.

Figure 7A:
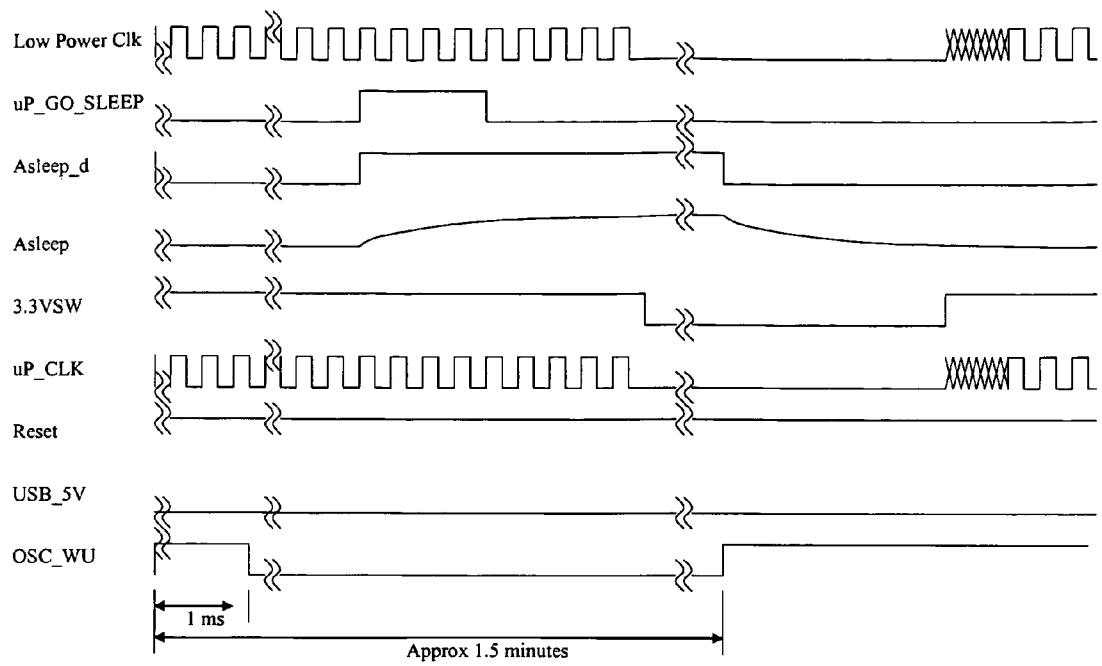
FIGS. 7A-7D provide timing diagrams illustrating low-power modes for the data-acquisition units in embodiments of the invention.

The behavior of the data acquisition unit during low-power modes may be further understood with reference to FIGS. 7A-7D, which show exemplary timing diagrams for one embodiment. FIG. 7A shows a detailed timing relationship of the microprocessor's oscillator, microprocessor reset, and wake-up signals throughout the sleep and listen power cycle shown in FIG. 6A between data acquisitions. It is noted that one part of this cycle is that the reset signal is never asserted, so the microprocessor does not need to reload its program code into local RAM. It is also noted that the microprocessor sleep signal uP_GO_SLEEP does not become active until after the wake-up pulse OSC_WU is unasserted.

Figure 7B:
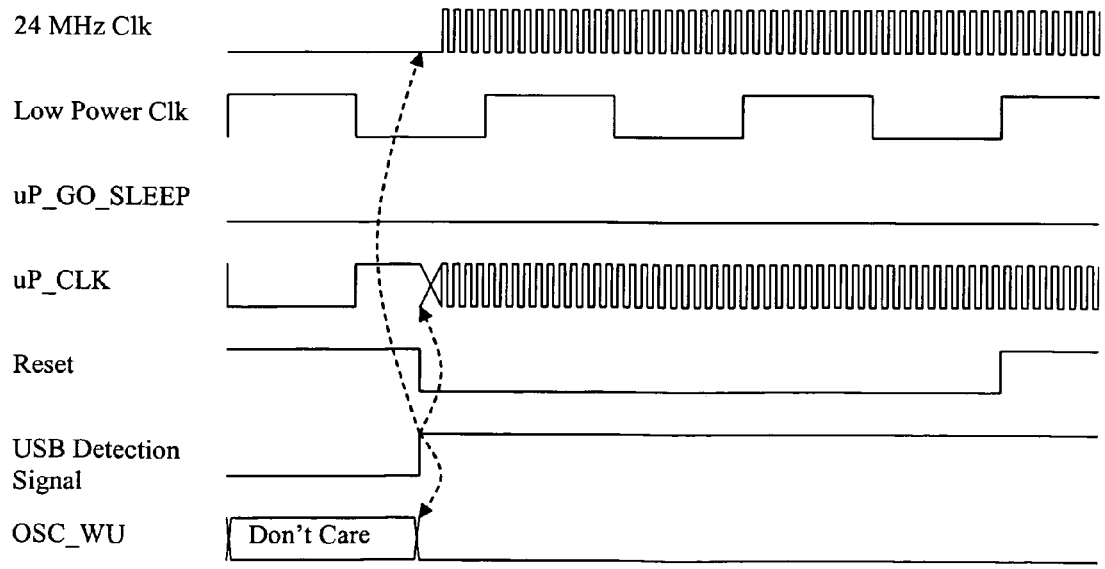
Figure 7C:
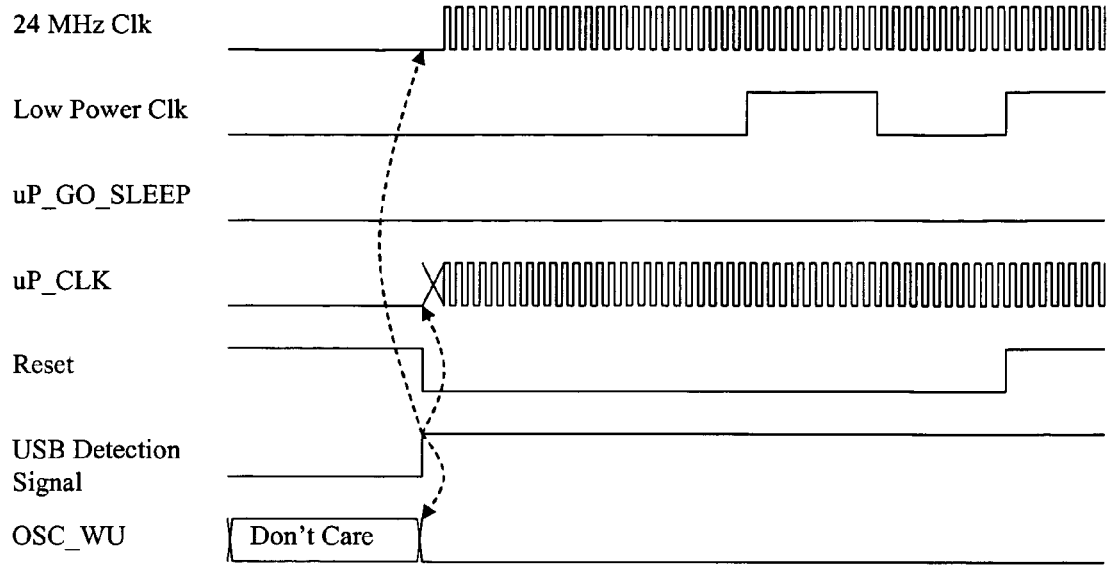
Figure 7D:
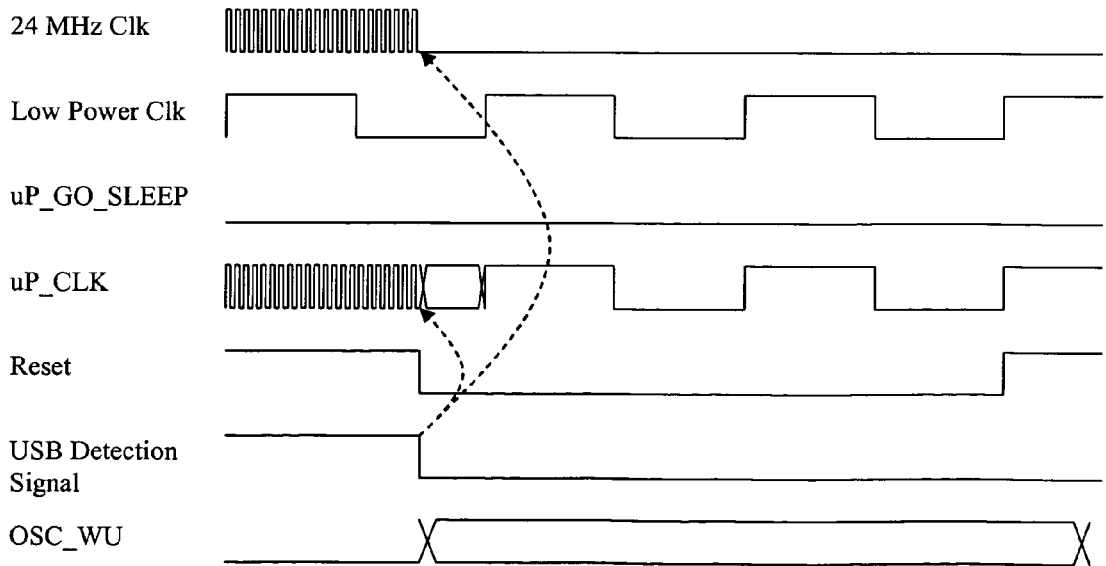

FIGS. 7B and 7C illustrate the oscillator switch over and reset signal details when connecting the data acquisition unit to the data offload and charging unit. FIG. 7B illustrates a case where the microprocessor is running, in either the listen or data acquisition mode, and the data acquisition unit detects connection to the data offload and charging unit. FIG. 7C shows a similar situation, but without the low power clock running, i.e. in sleep mode. As seen in both these figure, reset is active during the oscillator switchover. FIG. 7D shows details of an oscillator switch over when the data acquisition unit is disconnected from the data offload and charging unit. Reset is again active during the oscillator switch over. The wake-up pulse OSC_WU is prevented from activation when connected to the data offload and charging unit, but once disconnected, the OSC_WU timing is indeterminate because of its asynchronous nature. If the OSC_WU signal is a short glitch, which does not wake up the microprocessor, then the microprocessor will wake up on the next OSC_WU pulse.

Exemplary Applications

There are a number of applications using the methods and systems of the invention that illustrate advantages in some embodiments. In some embodiments, for example, the data acquisition units may be used with human-initiated events. Some such human-initiated events may be intended specifically to provide acoustic sources for use in seismic investigation while others may provide seismic information only passively or incidentally. For example, in some embodiments, the data acquisition units may be distributed over a survey area where explosions may be initiated with dynamite, but which has poor radio contact. In such instances, the convenience of the units' ability to collect data continuously, without the need for radio contact, may be exploited in combination with the ease of synchronization despite the poor radio contact of the survey area. Also, in some instances, the geographical distribution of the data acquisition units may vary in depth with respect to the surface of the Earth, rather than solely on or above its surface. For example, some of the units could be positioned within vertical mines or other shafts, enabling information resulting from different collector-unit distributions to be obtained. Analysis using data from such a vertical distribution of collector units is sometimes referred to as "tomographic analysis."

In other embodiments, seismic data may be collected passively from an urban or suburban area, or from any other area where active data acquisition is difficult. Passive source events may be produced, for example, by placing obstructions laterally across road surfaces so that acoustic events are initiated when vehicles drive over them. Other mechanisms for passive generation of acoustic events will be apparent to those of skill in the art. The data acquisition units may then be placed near in the urban or suburban regions to detect acoustic responses to these sources from the Earth. The ability of the data acquisition units to record continuously over long periods of time without specific knowledge of the timing of acoustic events permits them to collect information that may then be used as described herein to identify subterranean properties in the urban, suburban, or other survey area. It is generally expected that the magnitude of such passive acoustic sources will be most suitable for mapping shallow events, but in some instances mapping of deeper events may also be performed in this manner.

The use of long-time continuous recording without specific knowledge of acoustic-event timing may be exploited in peripheral applications. For example, seismic testers are frequently subject to complaints from homeowners and others that explosions used to generate acoustic sources have resulted in damage to structures. The cost to defend such allegations by seismic testers is significant. Very often, the strength of acoustic impulses at the locations where structures have been damaged is insufficient to cause the damage reported, but there is frequently insufficient information to point to an alternative source for the damage. The use of some of the data acquisition units during a seismic test period at various locations may produce more specific evidence that may be used in the defense of such allegations, specifically by providing a real-time record of peak particle velocity ("PPV") in defined locations. In particular, the data acquisition units may indicate not only the local strength of the explosion alleged to have caused the damage at those defined locations, but also the local strength of other acoustic sources, such as may be provided by aircraft, trains, weather patterns, and the like. In instances where the PPV at a particular time and location is clearly linked with a different acoustic event, the likelihood that damage was caused by the seismic testing is at best minimal. This ability to provide comparative evidence, correlated with the time other sources produced acoustic disturbances, may allow unwarranted allegations to be disposed of more quickly.

Having described several such embodiments, it will be recognized by those of skill in the art that various other modifications, alternative constructions, and equivalents may be used without departing from the spirit of the invention. Accordingly, the above description should not be taken as limiting the scope of the invention, which is defined in the following claims.

What is claimed is:

1. A data offload and charger unit for simultaneously retrieving data from a plurality of seismic data acquisition units and recharging such seismic data acquisition units, the data offload and charger unit comprising:

a frame defining a plurality of stations for holding the seismic data acquisition units;

a host computer;

an integrated power and communications port at each such station adapted to interface with a respective one of the seismic data acquisition units such that power may flow from the data offload and charger unit to the respective one of the seismic data acquisition units and data may flow from the respective one of the seismic data acquisition units to the host computer simultaneously and such that interfacing the respective one of the seismic data acquisition units with a respective one of the integrated power and communications ports activates a connection signal prompting the respective one of the seismic data acquisition units to switch from a first clock frequency to a second clock frequency, wherein:

the first clock frequency is slower than the second clock frequency;

the respective one of the seismic data acquisition units operates at the first clock frequency while being powered by at least one battery; and the respective one of the seismic data acquisition units operates at the second clock frequency while data is flowing to the host computer; and communications links between the host computer and each integrated power and communications port.

2. The data offload and charger unit recited in claim 1 further comprising orientation structure at each such station to maintain the respective one of the seismic data acquisition units in a predetermined orientation relative to the integrated power and communications port.

3. The data offload and charger unit recited in claim 1 further comprising a communications link from the host computer to a data-reduction computer having programming to receive and analyze data received from the host computer.

4. The data offload and charger unit recited in claim 1 further comprising a plurality of offload/charging modules, each such offload/charging module interfaced with a distinct plurality of the stations.

5. The data offload and charger unit recited in claim 4 wherein each such offload/charging module comprises a data multiplexer to combine data received from each of the stations interfaced with such offload/charging module.

6. The data offload and charger unit recited in claim 1 wherein the host computer includes:
   microprocessor code for implementing data flow from the seismic data acquisition units to the host computer; and
   instructions to load code from the host computer into a connected seismic data acquisition unit upon detection that the connected seismic data acquisition unit has been connected with a respective one of the stations as part of a data-offload process.

7. The data offload and charger unit recited in claim 6 wherein the instructions include instructions to disconnect a boot field code to allow code specific to the data-offload process to be loaded into the connected seismic data acquisition unit.

8. The data offload and charger unit recited in claim 1 wherein the host computer comprises a plurality of host computers interconnected with a computer network, each such host computer having an interface to a subset of the plurality of the stations.

9. A method for retrieving data stored on a plurality of seismic data acquisition units, the method comprising:
   receiving the plurality of seismic data acquisition units at a data offload and charger unit;
   interfacing with each such seismic data acquisition unit at a respective interface, wherein interfacing activates a connection signal prompting the respective one of the seismic data acquisition units to switch from a first clock frequency to a second clock frequency, wherein:
      the first clock frequency is slower than the second clock frequency;
      the respective one of the seismic data acquisition units operates at the first clock frequency while being powered by a battery; and
      the respective one of the seismic data acquisition units operates at the second clock frequency while data is flowing to a host computer;
   downloading data from the each such seismic data acquisition unit through the respective interface to the host computer; and
   recharging the battery comprised by the each such seismic data acquisition unit through the respective interface simultaneously with downloading data from the each such seismic data acquisition unit.

10. The method recited in claim 9 further comprising transmitting the downloaded data from the host computer to a data-reduction computer for processing.

11. The method recited in claim 9 further wherein downloading data comprises multiplexing data from each seismic data acquisition unit of a plurality of distinct subsets of the data acquisition units.

12. The method recited in claim 9 further comprising loading code from the host computer into a connected seismic data acquisition unit upon detection that the connected seismic data acquisition unit has been connected with a respective one of the stations as part of a data-offload process.

13. The method recited in claim 12 wherein loading code comprises disconnecting a boot field code to allow code specific to the data-offload process to be loaded into the connected seismic data acquisition unit.

14. A system for processing seismic data, the system comprising:
   a plurality of seismic data acquisition units holding seismic data collected over a survey area, wherein each of the plurality of seismic data acquisition units comprises:
      a microprocessor;
      an antenna adapted to receive an electromagnetic signal;
      a decoder connected with the microprocessor and adapted to convert received electromagnetic signals to dual-tone multiple-frequency ("DTMF") digits;
      a geophone interface with a geophone for collecting seismic data incident on the geophone;
      a memory connected with the geophone interface for storing a representation of the collected seismic data and for storing a representation of a reference electromagnetic signal to be used in synchronizing seismic data collected by other data acquisition units; and
      a battery power source connected with the microprocessor;
   a host computer;
   a data offload and charger unit having a plurality of stations for holding the seismic data acquisition units and adapted to interface with each of the seismic data acquisition units to simultaneously retrieve data from the seismic data acquisition units and recharge the seismic data acquisition units; and
   communications links from the host computer to each of the plurality of stations of the data offload and charger unit;
   a data-reduction computer having programming instructions to receive and analyze data received from the host computer; and
   a communication link from the host computer to the data-reduction computer.

15. The system recited in claim 14 further wherein the data offload and charger unit comprises a plurality of offload/charging modules, each such offload/charging module interfaced with a distinct plurality of the stations.

16. The system recited in claim 15 wherein each such offload/charging module comprises a data multiplexer to combine data received from each of the stations interfaced with such offload/charging module.

17. The data offload and charger unit recited in claim 1 further comprising an external circuitry that asserts a reset line of the respective one of the seismic data acquisition units when the respective one of the seismic data acquisition units switches from the first clock frequency to the second clock frequency until an oscillator of the respective one of the seismic data acquisition units is stable.

* * * * *

UNITED STATES PATENT AND TRADEMARK OFFICE
CERTIFICATE OF CORRECTION

PATENT NO. : 7,668,044 B2  Page 1 of 1
APPLICATION NO. : 11/118103
DATED : February 23, 2010
INVENTOR(S) : Brinkman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1073 days.

Signed and Sealed this

Seventh Day of December, 2010

David J. Kappos
*Director of the United States Patent and Trademark Office*